(12) United States Patent
Wei et al.

(10) Patent No.: US 11,706,760 B2
(45) Date of Patent: Jul. 18, 2023

(54) METHOD AND APPARATUS FOR HANDLING REPETITIONS OF PHYSICAL UPLINK SHARED CHANNEL (PUSCH) TRANSMISSION IN A WIRELESS COMMUNICATION SYSTEM

(71) Applicant: FG Innovation Company Limited, Tuen Mun (HK)

(72) Inventors: Chia-Hung Wei, Taipei (TW); Heng-Li Chin, Taipei (TW); Wan-Chen Lin, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/535,875

(22) Filed: Nov. 26, 2021

(65) Prior Publication Data
US 2022/0086876 A1 Mar. 17, 2022

Related U.S. Application Data

(63) Continuation of application No. 16/930,257, filed on Jul. 15, 2020, now Pat. No. 11,224,059.
(Continued)

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0092* (2013.01); *H04W 72/042* (2013.01); *H04W 76/27* (2018.02)

(58) Field of Classification Search
CPC .......... H04W 72/1268; H04W 72/042; H04W 76/27; H04L 5/0092; H04L 1/0025;
(Continued)

(56) References Cited

U.S. PATENT DOCUMENTS 10,631,174 B2 * 4/2020 You ........................ H04L 5/0053
2019/0020506 A1 * 1/2019 Cheng ..................... H04L 1/007

FOREIGN PATENT DOCUMENTS

WO 2018175596 A1 9/2018

OTHER PUBLICATIONS

Huawei, HiSilicon, PUSCH reliability for Urllc, 3GPP TSG RAN WG1 #93 Busan Korea May 21-25, 2018, R1-1806902.
(Continued)

*Primary Examiner* — Kyaw Z Soe
(74) *Attorney, Agent, or Firm* — ScienBiziP, P.C.

(57) ABSTRACT

A method performed by a BS for handling repetitions of transmissions is provided. The method includes transmitting an RRC configuration including a first parameter configured with a first value and a second parameter configured with at least one second value; and transmitting DCI on a PDCCH scheduling a PUSCH transmission. The DCI enables the UE to select one of the first parameter and the second parameter to determine a number of PUSCH repetitions; determine the number of PUSCH repetitions as the first value when the first parameter is selected; determine the number of PUSCH repetitions as one of the at least one second value indicated by the DCI when the second parameter is selected; and perform the PUSCH transmission for a number of times based on the number of PUSCH repetitions. A BS using the aforementioned method is also provided.

8 Claims, 10 Drawing Sheets

Related U.S. Application Data

(60) Provisional application No. 62/875,335, filed on Jul. 17, 2019.

(51) Int. Cl.
*H04W 72/04* (2009.01)
*H04W 76/27* (2018.01)
*H04W 72/1268* (2023.01)

(58) Field of Classification Search
CPC ....... H04L 1/08; H04L 1/1896; H04L 5/0044; H04L 1/189
See application file for complete search history.

(56) References Cited

OTHER PUBLICATIONS

3GPP TS 38.331, "3rd Generation Partnership Project; Technical Specification Group Radio Access Network; NR Radio Resource Control (RRC) protocol specification (Release 15)", V15 11.0 (Sep. 2020).

3GPP TS 38.212, "3rd Generation Partnership Project; Technical Specification Group Radio Access Network; NR Multiplexing and channel coding (Release 16)", V16.3.0 (Sep. 2020).

3GPP TS 38.213, "3rd Generation Partnership Project; Technical Specification Group Radio Access Network; NR Physical layer procedures for control (Release 15)", V15.11.0 (Sep. 2020).

3GPP TS 38.214, "3rd Generation Partnership Project; Technical Specification Group Radio Access Network; NR Physical layer procedures for data (Release 15)", V15.11.0 (Sep. 2020).

3GPP TS 38.321, "3rd Generation Partnership Project; Technical Specification Group Radio Access Network; NR Medium Access Control (MAC) protocol specification (Release 15)", V15.10 0 (Sep. 2020).

Panasonic, On PUSCH enhancements for Nr Urllc, 3GPP TSG RAN WG1 #96bis China, Apr. 8-12, 2019, R1-1904188.

ETRI, "Potential enhancements to Pusch", 3GPP TSG RAN WG1 #96 Athens, Greece, 25th Feb.-Mar. 1, 2019, R1-1902443, Section 2.2.

\* cited by examiner

METHOD AND APPARATUS FOR HANDLING REPETITIONS OF PHYSICAL UPLINK SHARED CHANNEL (PUSCH) TRANSMISSION IN A WIRELESS COMMUNICATION SYSTEM

CROSS-REFERENCE TO RELATED APPLICATION(S)

The present disclosure is a continuation application of U.S. patent application Ser. No. 16/930,257, filed on Jul. 15, 2020, which claims the benefit of and priority to U.S. Provisional Patent Application Ser. No. 62/875,335, filed on Jul. 17, 2019, the content(s) of all of which are hereby fully incorporated herein by reference for all purposes.

FIELD

The present disclosure generally relates to wireless communications, and more particularly, to methods and apparatuses for handling repetitions of a Physical Uplink (UL) Shared Channel (PUSCH) transmission in a wireless communication system.

BACKGROUND

With the tremendous growth in the number of connected devices and the rapid increase in user/network traffic volume, various efforts have been made to improve different aspects of wireless communication for the next generation wireless communication system, such as the fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements of wireless communication for the next generation wireless communication system.

SUMMARY

The present disclosure is directed to methods and apparatuses for handling repetitions of a PUSCH transmission in a wireless communication system.

According to a first aspect of the present disclosure, a method performed by a Base Station (BS) for handling repetitions of transmissions in a wireless communication system is provided. The method includes transmitting, to a User Equipment (UE), a Radio Resource Control (RRC) configuration including a first parameter configured with a first value and a second parameter configured with at least one second value, each of the first value and the at least one second value indicating a number of Physical Uplink Shared Channel (PUSCH) repetitions; and transmitting, to the UE, Downlink Control Information (DCI) on a Physical Downlink Control Channel (PDCCH) scheduling a PUSCH transmission, wherein the DCI enables the UE to: select one of the first parameter and the second parameter to determine a number of PUSCH repetitions for the PUSCH transmission; determine the number of PUSCH repetitions for the PUSCH transmission as the first value when the first parameter is selected; determine the number of PUSCH repetitions for the PUSCH transmission as one of the at least one second value indicated by the DCI when the second parameter is selected; and perform the PUSCH transmission for a number of times based on the number of PUSCH repetitions for the PUSCH transmission.

In some implementations of the first aspect of the present disclosure, the DCI further enables the UE to select the second parameter to determine the number of PUSCH repetitions for the PUSCH transmission when the DCI has a DCI format associated with the second parameter and includes an index indicating the one of the at least one second value.

In some implementations of the first aspect of the present disclosure, the second parameter defines an association between the index and a set of values including a third value indicating a starting symbol of the PUSCH transmission and a fourth value indicating a number of consecutive symbols of the PUSCH transmission.

In some implementations of the first aspect of the present disclosure, the first parameter and the second parameter are configured per a Bandwidth Part (BWP) basis.

According to a second aspect of the present disclosure, a BS for handling repetitions of transmissions in a wireless communication system. The BS includes one or more non-transitory computer-readable media having computer-executable instructions embodied thereon and at least one processor coupled to the one or more non-transitory computer-readable media. The at least one processor is configured to execute the computer-executable instructions to: transmit, to a UE, an RRC configuration including a first parameter configured with a first value and a second parameter configured with at least one second value, each of the first value and the at least one second value indicating a number of PUSCH repetitions; and transmit, to the UE, DCI on a PDCCH scheduling a PUSCH transmission, wherein the DCI enables the UE to select one of the first parameter and the second parameter to determine a number of PUSCH repetitions for the PUSCH transmission; determine the number of PUSCH repetitions for the PUSCH transmission as the first value when the first parameter is selected; determine the number of PUSCH repetitions for the PUSCH transmission as one of the at least one second value indicated by the DCI when the second parameter is selected; and perform the PUSCH transmission for a number of times based on the number of PUSCH repetitions for the PUSCH transmission.

According to a third aspect of the present disclosure, a method performed by a User Equipment (UE) for handling repetitions of transmissions in a wireless communication system is provided. The method includes a UE receiving a Radio Resource Control (RRC) configuration including a first parameter configured with a first value and a second parameter configured with at least one second value. Each of the first value and the at least one second value indicates a number of Physical Uplink Shared Channel (PUSCH) repetitions. The method further includes the UE receiving Downlink Control Information (DCI) on a Physical Downlink Control Channel (PDCCH) scheduling a PUSCH transmission, selecting, according to the DCI, one of the first parameter and the second parameter to determine a number of PUSCH repetitions for the PUSCH transmission, applying the first value as the number of repetitions for the PUSCH transmission when the first parameter is selected, applying one of the at least one second value indicated by the DCI as the number of PUSCH repetitions for the PUSCH transmission when the second parameter is selected, and performing the PUSCH transmission for a number of times.

The number of times is determined by the number of PUSCH repetitions for the PUSCH transmission.

According to a fourth aspect of the present disclosure, a UE for handling repetitions of transmissions in a wireless communication system is provided. The UE includes one or more non-transitory computer-readable media having computer-executable instructions embodied thereon and at least one processor coupled to the one or more non-transitory computer-readable media. The at least one processor is configured to execute the computer-executable instructions to receive an RRC configuration including a first parameter configured with a first value and a second parameter configured with at least one second value. Each of the first value and the at least one second value indicates a number of PUSCH repetitions. The at least one processor is further configured to execute the computer-executable instructions to receive DCI on a PDCCH scheduling a PUSCH transmission, select, according to the DCI, one of the first parameter and the second parameter to determine a number of PUSCH repetitions for the PUSCH transmission, apply the first value as the number of PUSCH repetitions for the PUSCH transmission when the first parameter is selected, apply one of the at least one second value indicated by the DCI as the number of PUSCH repetitions for the PUSCH transmission when the second parameter is selected, and perform the PUSCH transmission for a number of times. The number of times is determined by the number of PUSCH repetitions for the PUSCH transmission.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
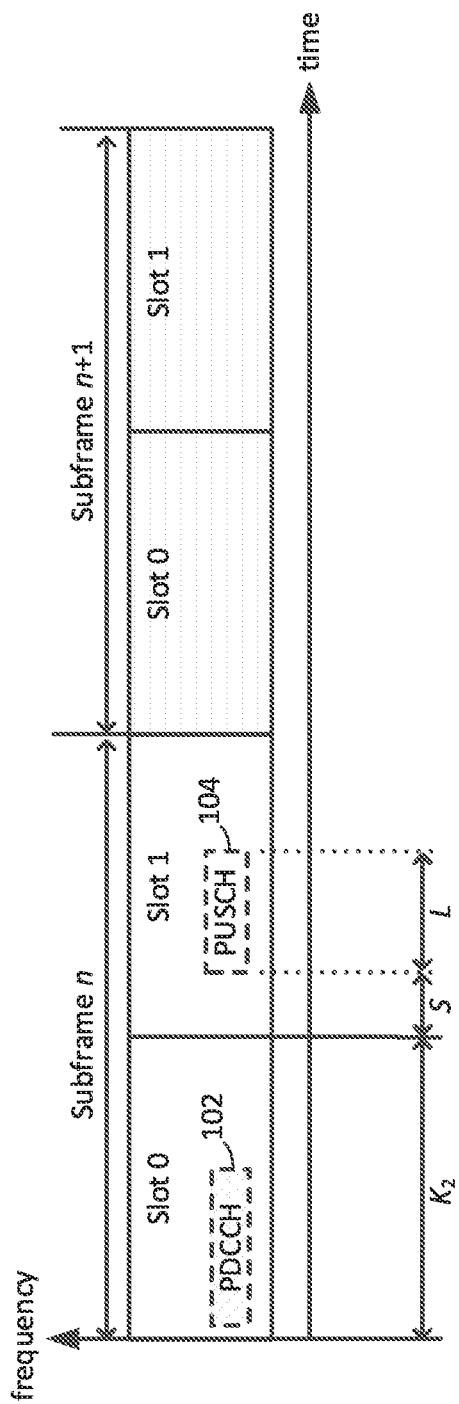
FIG. 1 is a diagram illustrating a PUSCH transmission scheduled by a PDCCH, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purposes of non-limiting explanation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, a LTE-Advanced (LTE-A) system, or a LTE-Advanced Pro system) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA BS in connection with the 5GC, a next generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present disclosure should not be limited to the above mentioned protocols.

The BS may be operable to provide radio coverage to a specific geographical area using a plurality of cells being included the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the DL and optionally Uplink (UL) resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as a Special Cell (SpCell). A PCell may refer to the SpCell of an MCG. A PSCell may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as eMBB, mMTC and URLLC, while fulfilling high reliability, high data rate and low latency requirements. The orthogonal frequency-division multiplexing (OFDM) technology as agreed in 3rd Generation Partnership Project (3GPP) may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, a DL transmission data, a guard period, and a UL transmission data should at least be included, where the respective portions of the DL transmission data, the guard period, the UL transmission data should also be configurable, for example, based on the network dynamics of NR. In addition, sidelink resource may also be provided in an NR frame to support ProSe services.

In the 3GPP Release 16 (Rel-16) NR wireless communication system, a UE may be configured to periodically, discontinuously, or continuously monitor a PDCCH in the time domain and find a possible dynamic UL grant (scheduling) that is scheduled by a gNB via the PDCCH. For example, the UL grant may be received on (UE-specific) DCI with Cyclic Redundancy Check (CRC) bit(s) scrambled by a UE-specific Radio Network Temporary Identifier (RNTI) (e.g., Cell-RNTI (C-RNTI)). The DCI may be found by the UE on the PDCCH via blind decoding. The DCI may indicate a UL grant of a Physical Uplink Shared Channel (PUSCH). For example, the DCI may indicate the time and frequency locations of the PUSCH. Once the UL grant is obtained, the UE may perform the corresponding UL data transmission (or "PUSCH transmission") on the PUSCH by utilizing the UL grant. For example, the PUSCH transmission may include transmitting a Transport Block (TB) at the UE. It is noted that the term "PUSCH transmission/repetition" and the term "TB transmission/repetition" may be interchangeable in some implementations of the present disclosure.

In some implementations, a PUSCH transmission(s) may be dynamically scheduled by a BS (e.g., a gNB) via a UL grant in the DCI, or scheduled by a configured grant of Type 1 or Type 2.

FIG. 1 is a diagram illustrating a PUSCH transmission scheduled by a PDCCH, in accordance with an implementation of the present disclosure. It should be noted that even though each subframe (e.g., the subframe n and the subframe n+1) includes two slots (e.g., the slot 0 and the slot 1) in the example implementation illustrated in FIG. 1, each subframe may include any number of slots in other implementations of the present disclosure. For example, the number of slots in each subframe may be determined based on a configuration of numerology. In addition, a fixed number of symbols may be contained in each slot.

As illustrated in FIG. 1, three parameters, $K_2$, S and L, may be used to determine the time location and duration of a PUSCH 104 scheduled by a PDCCH 102. For example, the parameter $K_2$ may be used to determine a slot offset between the slot (e.g., the slot 0) containing the PDCCH (e.g., the PDCCH 102) carrying the DCI that indicates a PUSCH resource assignment and the slot (e.g., the slot 1) containing the PUSCH resource assigned by the DCI (e.g., the PUSCH 104). The parameters S may be an index of the starting symbol of the scheduled PUSCH (e.g., the PUSCH 104) in the slot (e.g., the slot 1) indicated by $K_2$. The parameter L may be the number of consecutive symbols of the scheduled PUSCH (e.g., the PUSCH 104) in the indicated slot (e.g., the slot 1).

In some implementations, the values of $K_2$, S and L for each dynamic grant from a BS may be derived by a UE based on a configuration for the numerology of a Bandwidth Part (BWP) and/or an index (e.g., a time domain resource assignment) contained in the DCI.

Figure 2:
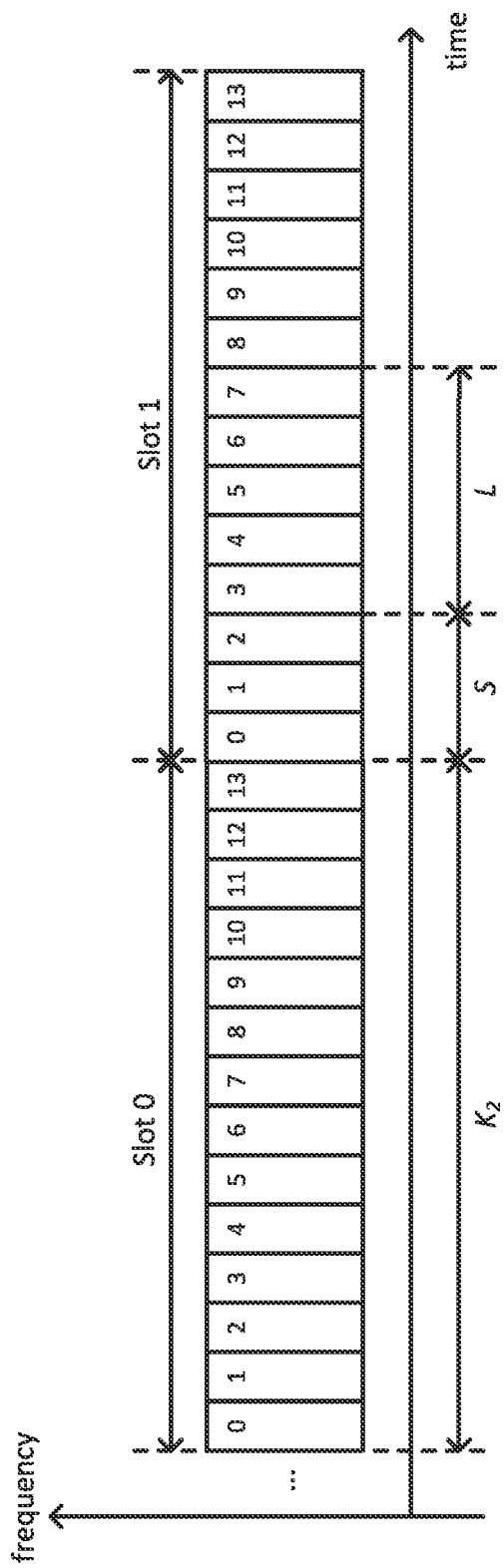
FIG. 2 is a diagram illustrating a PUSCH transmission scheduled by a PDCCH, in accordance with another implementation of the present disclosure.

FIG. 2 is a diagram illustrating a PUSCH scheduled by a PDCCH, in accordance with another implementation of the present disclosure. As illustrated in FIG. 2, there are two slots (e.g., slot 0 and slot 1) in each subframe, and each slot contains 14 symbols (e.g., the symbol 0 to the symbol 13). In the example implementation illustrated in FIG. 2, the parameters $K_2$, S and L are configured as "1," "3" and "5," respectively. Therefore, the UL resource scheduled by the BS on a PUSCH may start from the symbol 3 of the slot 1 and end at the symbol 7 of the slot 1.

In an NR wireless communication system, a PUSCH repetition scheme may be used to increase the reliability of data transmission. The PUSCH repetition scheme may include a UE performing a PUSCH transmission repeatedly, where the number of times that the UE performs the PUSCH transmission may be referred to as the number of PUSCH repetitions. It is noted that the phrases "the number of PUSCH repetitions," "the number of nominal PUSCH repetitions," "the number of repetitions," "the number of nominal repetitions," "the number of repetitions of a PUSCH transmission," "the number of nominal repetitions of a PUSCH transmission," and "the number of PUSCH transmissions" may be interchangeable in some implementations of the present disclosure.

In some implementations, in order to fulfill the requirement of URLLC, the PUSCH repetition scheme may be implemented as performing a PUSCH transmission repeatedly by a UE in several consecutive slots, where each repeated PUSCH transmission (or "PUSCH repetition") in each slot may have the same symbol allocation (e.g., corresponding to the same values of S and L). This type of PUSCH repetition scheme may be referred to as a slot-based repetition scheme.

In some implementations, an improved PUSCH repetition scheme is provided. Compared to the slot-based repetition scheme, the improved PUSCH repetition scheme can reduce the time interval between each two adjacent PUSCH repetitions, so as to decrease the overall transmission time required for the transmission delay spreading among the PUSCH repetitions. For example, the enhanced PUSCH repetition scheme may allow a UE to perform one or more repeated PUSCH transmissions (or "PUSCH repetitions") in a slot. In addition, the number of PUSCH repetitions may be expected to support a dynamic change for each dynamic scheduling. The improved PUSCH repetition scheme may be referred to as a non-slot-based repetition scheme.

In some implementations, when a BS schedules a UE to perform a PUSCH transmission, the BS may dynamically instruct the UE to perform the PUSCH transmission with the slot-based repetition scheme or the non-slot-based repetition scheme.

In some implementations, a non-slot-based repetition scheme may include the operations listed below (e.g., operations (a) to (f)). However, it should be noted that the listed operations are shown for illustrative purposes only, and are not mean to limit the scope of the present disclosure. For example, one or more of operations listed below may be not be included in the non-slot-based repetition scheme in some implementations of the present disclosure.

The operations (a) through (f) may include:

(a) a BS (e.g., a gNB) may indicate to a UE a slot offset between a slot that contains a PDCCH scheduling a PUSCH transmission and a slot that contains the scheduled PUSCH transmission ($K_2$);

(b) the BS may indicate to the UE the starting symbol of the PUSCH transmission (S);

(c) the BS may indicate to the UE the length of a present PUSCH transmission (L), where the length of the PUSCH transmission may be represented by the number of symbols;

(d) the BS may indicate to the UE the number of the (nominal) repetitions for a present PUSCH transmission (e.g., how many times this PUSCH transmission should be repeated by the UE);

(e) the UE may start performing a repeated PUSCH transmission (or the second PUSCH repetition) from the first upcoming UL symbol right after the end of a present PUSCH transmission (or the first PUSCH repetition) scheduled by the BS; and (f) each PUSCH repetition may start from the first upcoming UL symbol after the end of the previous PUSCH repetition.

In general, each PUSCH repetition may occupy L consecutive symbols. However, if the L consecutive symbol occasions corresponding to a PUSCH repetition (or PUSCH transmission) cross a DL symbol or a slot boundary, the PUSCH repetition may be divided into two or more actual PUSCH transmissions from the perspective of the Physical (PHY) layer.

Figure 3:
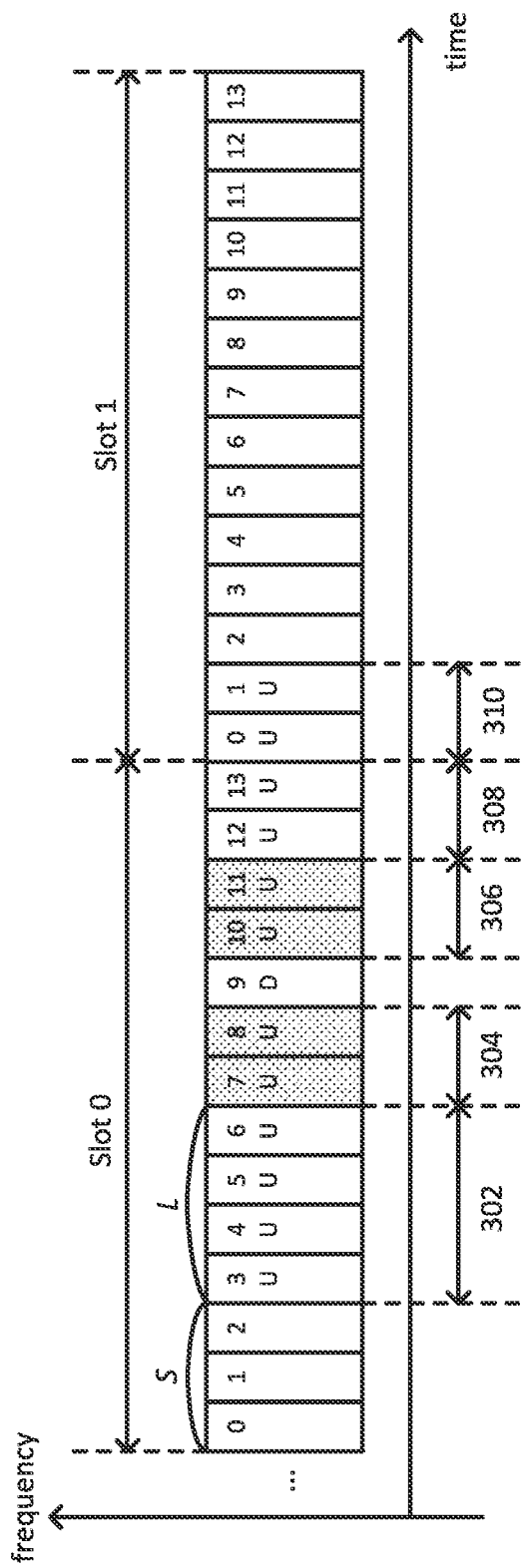
FIG. 3 is a diagram illustrating repetitions of a PUSCH transmission crossing a downlink (DL) symbol or a slot boundary when the non-slot-based repetition scheme is applied, in accordance with an implementation of the present disclosure.

FIG. 3 is a diagram illustrating repetitions of a PUSCH transmission (or "PUSCH repetition") crossing a DL symbol or a slot boundary when the non-slot-based repetition scheme is applied, in accordance with an implementation of the present disclosure. It is noted that the non-slot-based repetition scheme illustrated with reference to FIG. 3 is for illustrative purposes only, and is not intended to limit the scope of the present disclosure.

As illustrated in FIG. 3, each of the slots (e.g., the slot 0 and the slot 1) may include 14 symbols (e.g., the symbol 0 to the symbol 13). Each symbol denoted by the letter "U" is a UL symbol, and each symbol denoted by the letter "D" is a DL symbol. In the implementation illustrated in FIG. 3, the values of S, L, and the number of PUSCH repetitions configured by a BS (e.g., a gNB) are 3, 4 and 3, respectively.

It is noted that the number of PUSCH repetitions configured/signaled by a BS (e.g., a gNB) to a UE may be referred to as the number of nominal repetitions, which may be different from the number of actual PUSCH transmissions performed by the UE from the perspective of the PHY layer. As illustrated in FIG. 3, the UE may know that the UL resource scheduled by the BS on a PUSCH transmission 302 may span from the symbol 3 to the symbol 6 in the slot 0 because the values of S and L are 3 and 4, respectively. In addition, because the number of nominal repetitions is 3 in the implementation, the UE may need to repeat the PUSCH transmission 302 (the first (nominal) PUSCH repetition) twice more at the upcoming UL symbols. As described above, the value of L is 4, so each nominal repetition may include four UL symbols. However, because the symbol 9 of the slot 0 is a DL symbol, the second (nominal) PUSCH repetition may be divided into two actual PUSCH transmissions (or "actual PUSCH repetitions"). As illustrated in FIG. 3, the actual PUSCH repetition 304 may span from the symbol 7 to the symbol 8 of the slot 0, and the actual PUSCH repetition 306 may span from the symbol 10 to the symbol 11 of the slot 0. The two actual PUSCH repetitions 304 and 306 may occupy four symbols in total, so they may be equivalent to the second (nominal) PUSCH repetition. Similarly, because the third (nominal) PUSCH repetition covers the slot boundary between the slot 0 and the slot 1, the third (nominal) PUSCH repetition may be divided into two actual PUSCH repetitions 308 and 310, where the actual PUSCH repetition 308 may span from the symbol 12 to the symbol 13 of the slot 0, and the actual PUSCH repetition 310 may span from the symbol 0 to the symbol 1 of the slot 1. Thus, in the implementation illustrated in FIG. 3, the number of actual PUSCH repetitions (e.g., five) may be larger than the number of nominal PUSCH repetitions (e.g., three).

In some implementations, the value of L may represent the total number of UL symbols allocated for a PUSCH transmission. So, the total number of UL symbols needed for one PUSCH/TB repetition may be restricted to the value of L.

Figure 4:
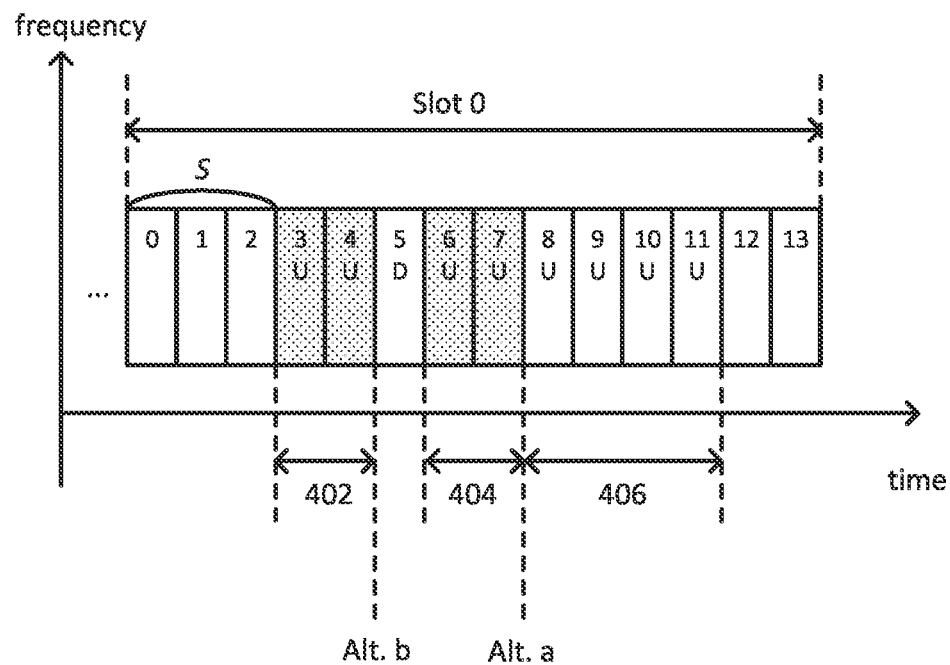
FIG. 4 is a diagram illustrating a repetition of a PUSCH transmission crossing a DL symbol when the non-slot-based repetition scheme is applied, in accordance with an implementation of the present disclosure.

FIG. 4 is a diagram illustrating a repetition of a PUSCH transmission crossing a DL symbol when the non-slot-based repetition scheme is applied, in accordance with an implementation of the present disclosure. In the implementation illustrated in FIG. 4, the DCI may contain a field/index indicating that the value of S is 3, the value of L is 4, and the number of nominal repetitions is 2 for a PUSCH transmission. In this case, the UL resource scheduled by the BS (e.g., the gNB) on the PUSCH may start at the symbol 3 of the slot 0. In addition, because the value of L is configured as 4 and the symbol 5 of slot 0 is a DL symbol, the UE may need to split the initial transmission of the PUSCH into two actual PUSCH transmissions: the first actual PUSCH transmission 402 spanning from the symbol 3 to the symbol 4 of the slot 0, and the second actual PUSCH transmission 404 spanning from the symbol 6 to the symbol 7 of the slot 0. Thus, the total occupancy of the UL symbols for the initial transmission of the PUSCH (or the "first nominal repetition") is still 4.

In some implementations, a UE may be configured with a repetition list, and the field/index contained in the DCI may be a row/entry index of the repetition list (e.g., TDRA index). In some implementations, the repetition list may be included in a Time Domain Resource Allocation (TDRA) table. An example of the repetition list is shown in Table 1.

TABLE 1

| Row index | $K_2$ | S | L | R |
|---|---|---|---|---|
| 0 | 1 | 3 | 4 | 2 |
| 1 | 1 | 4 | 6 | 3 |
| 2 | 2 | 2 | 4 | 4 |

As shown in Table 1, a repetition list may include several entries (or rows). Each entry in the repetition list may be indexed by a row index and include a set of parameters for configuring a PUSCH transmission, such as the parameters $K_2$, S, L and R, where each value of the parameter R in the repetition list may represent a specific number of PUSCH repetitions, and the definitions of the parameters $K_2$, S and L are described with reference to FIGS. 1 and 2.

In some implementations, a BS may indicate to a UE which entry in the repetition list to use via specific signaling (e.g., the DCI). The UE may determine the resource location and/or the number of PUSCH repetitions for a PUSCH transmission based on the value(s) in the indicated entry of the repetition list. For example, according to Table 1, if a BS transmits DCI including a row index of "0" to a UE, the UE may know that the first entry/row in the repetition list should be applied when performing a PUSCH transmission scheduled by the DCI. As shown in Table 1, the values of $K_2$, S, L and R in the first entry/row of the repetition list are "1," "3," "4" and "2," respectively. In such a case, the number of PUSCH repetitions for the PUSCH transmission corresponding to the DCI is 2, as illustrated in FIG. 4.

It should be noted that the implementation in Table 1 is shown for illustrative purposes only, and is not meant to limit the scope of the present disclosure. For example, the repetition list may include any combination of the parameter R and/or other parameters/indices. In another example, a repetition list may include only the value(s) of the parameter R (or "R value(s)").

In some implementations, the repetition list (e.g., including one or more R values) and the TDRA table may be separate tables, where each R value in the repetition table may be associated with a set of parameters (e.g., S, L, and/or $K_2$) included in the TDRA table. For example, the repetition list may include several R values, e.g., "2", "3" and "4", where the R value "2" may be associated with the set of parameters $K_2$, S and L (e.g., which are "1", "3" and "4", respectively) included in the first row/entry of the TDRA table, the R value "3" may be associated with the set of parameters $K_2$, S and L (e.g., which are "1", "4" and "6", respectively) included in the second row/entry of the TDRA table, and the R value "4" may be associated with the set of parameters $K_2$, S and L (e.g., which are "2", "2" and "4", respectively) included in the third row/entry of the TDRA table. In this case, the TDRA table may not include the R value(s). In addition, if the UE receives DCI containing a TDRA field that indicates a row/entry of the TDRA table, the set of parameters included in the indicated row/entry of the TDRA table, as well as the R value (in the repetition list) associated with the indicated row/entry of the TDRA table, may be applied by the UE for a PUSCH repetition scheme. For example, if the first row/entry of the TDRA table is indicated by the TDRA field of the DCI, the UE may determine that the values of $K_2$, S, L and R are "1", "3", "4" and "2", respectively, when applying a PUSCH repetition scheme for a PUSCH transmission.

Situation A: Discontinuous Reception (DRX) Operation Under Non-Slot-Based Repetition Scheme In some implementations, the Medium Access Control (MAC) entity of a UE may be configured by a gNB (e.g., via the RRC layer) to perform a DRX procedure that controls the PDCCH monitoring activity corresponding to a specific Radio Network Temporary Identifier (RNTI) of the MAC entity. The specific RNTI may be a Cell-RNTI (C-RNTI), a Configured Scheduling-RNTI (CS-RNTI), an Interruption-RNTI (INT-RNTI), a Slot Format Indication-RNTI (SFI-RNTI), a Semi Persistent-Channel State Information-RNTI (SP-CSI-RNTI), a Transmit Power-PUCCH-RNTI (TPC-PUCCH-RNTI), a TPC-PUSCH-RNTI, or a Transmit Power-Sounding Reference Signal-RNTI (TPC-SRS-RNTI). When a UE is in the RRC connected state (RRC CONNECTED), and if the UE is configured with a DRX function, the MAC entity of the UE may monitor a PDCCH discontinuously in the time domain during the DRX procedure. For example, the MAC entity may periodically monitor the control channel according to the configuration from the BS and the real traffic pattern, even if no data transmission occurs. In other words, the UE may monitor a PDCCH within a preconfigured period of time (e.g., the Active Time), even if no data transmission occurs. However, if the data transmissions occur during the Active Time, the UE may remain in the active state to complete the data transmission. During the Active Time, the UE may monitor the PDCCH for the possible data transmission/reception indication(s). During the DRX procedure, the UE may handle the PDCCH monitoring operation by maintaining several timers in the UE's MAC layer. The timers may include, for example, the on-duration timer, the DRX inactivity timer, the UL retransmission timer, the DL retransmission timer, UL Round Trip Time (RTT) Timer, and the DL RTT Timer.

In some implementations, the lengths of the on-duration timer, the DRX inactivity timer, the UL retransmission timer, the DL retransmission timer, the UL RTT Timer, and the DL RTT timer may be preconfigured by a BS (e.g., gNB) via the parameters drx-onDurationTimer, drx-Inactivity-Timer, drx-RetransmissionTimerUL, drx-RetransmissionTimerDL, drx-HARQ-RTT-TimerUL and drx-HARQ-RTT-TimerDL, respectively.

In some implementations, the parameters such as the drx-onDurationTimer, the drx-InactivityTimer, the drx-RetransmissionTimerUL, the drx-RetransmissionTimerDL, the drx-HARQ-RTT-TimerUL and the drx-HARQ-RTT-TimerDL may be configured by the BS via a UE-specific DL RRC message.

When a UE is in the Active Time and the monitored PDCCH indicates a UL transmission, the UL RTT timer may be started for the corresponding Hybrid Automatic Repeat Request (HARQ) process. The UL RTT timer may be maintained by the MAC entity per a UL HARQ process basis. The UL RTT timer may be used to calculate the minimum time duration before a UL HARQ retransmission grant expected by the MAC entity. The length of the UL RTT timer may be related to the gNB processing time/capacity. However, in the current communication system, how a UE (e.g., the UE's MAC entity) handles the UL RTT timer under the non-slot-based repetition scheme for a corresponding PUSCH transmission is still undefined (e.g., the start timing of the UL RTT timer is undefined). In addition, since the corresponding MAC behavior is still undefined, the gain of the power saving brought by the DRX function may be lost due to unproper synchronization between the gNB and the UE.

As described above, a BS may indicate to a UE a UL resource on a PUSCH via the DCI. For example, the DCI may contain a TDRA field/index (e.g., a row/entry index of a TDRA table, as shown in Table 1) that indicates the time location and duration of a PUSCH transmission. In response to receiving the DCI, the UE may perform the corresponding PUSCH transmission by utilizing the UL resource. If the UE is configured to perform a PUSCH repetition scheme, the time domain of the UL resource indicated by the TDRA field (e.g., the indicated symbol(s) and/or slot(s)) may be used as the UL resource for the first nominal repetition of the PUSCH transmission. In the following Cases 1, 2 and 3, various RTT timer operations of DRX under the PUSCH repetition scheme are provided.

Case 1

In some implementations, the value of S+L may be larger than the total number of symbols within a slot. Given that each of the slot contains 14 symbols, in order to achieve the low latency requirement for the URLLC service, a UL grant with the value of S+L larger than 14 may be applied.

Figure 5:
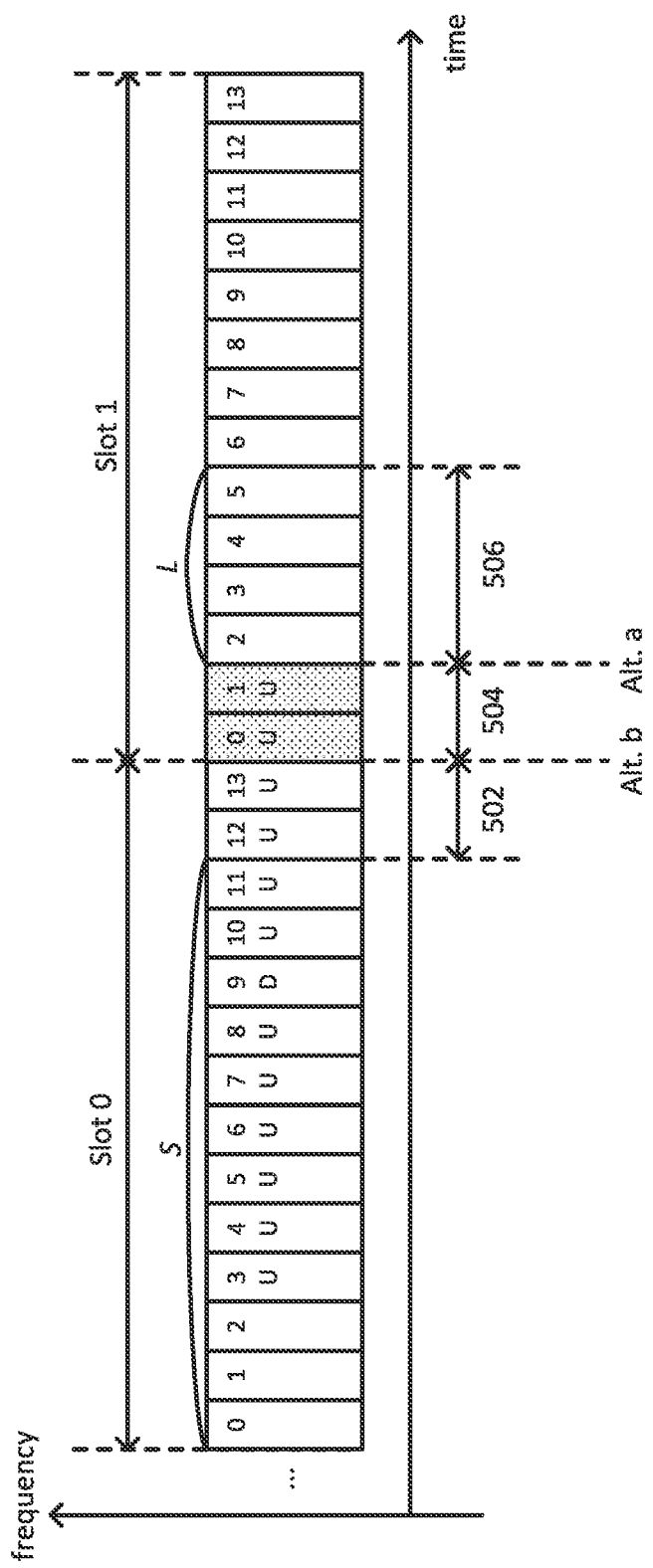
FIG. 5 is a diagram illustrating a PUSCH transmission corresponding to a UL grant with the value of S+L larger than the number of symbols per slot, in accordance with an implementation of the present disclosure.

FIG. 5 is a diagram illustrating a PUSCH transmission corresponding to a UL grant with the value of S+L larger than the number of symbols per slot (e.g., 14 symbols), in accordance with an implementation of the present disclosure.

The UE may receive the DCI from the gNB. The DCI may include a TDRA field that indicates a UL resource for a PUSCH transmission. In some implementations, the TDRA field may be a row index included in a TDRA table (e.g., as shown in Table 1). In some implementations, the TDRA field may be a row/entry index that indicates a row/entry included in a TDRA table, but the row/entry index may not be included in the TDRA table (e.g., in a case of the column of "Row index" in Table 1 being removed). In this condition, the TDRA table may include the parameter(s) such as S, L, $K_2$ and/or R, except for the row index(s). The UE may know which row/entry in the TDRA table is indicated by the TDRA field of the DCI according to a preconfigured mapping rule. For example, when the value of the TDRA field is "1", the UE may know that the parameters (e.g., S, L, $K_2$ and/or R) included in the first row/entry in the TDRA table are selected; when the value of the TDRA field is "2", the UE may know that the parameters (e.g., S, L, $K_2$ and/or R) included in the second row/entry in the TDRA table are selected, and so on. In the implementation illustrated in FIG.

5, the values of S and L addressed by the TDRA field are 12 and 4, respectively. As illustrated in FIG. 5, the UL resource scheduled by the gNB on the PUSCH may span from the symbol 12 of the slot 0 to the symbol 1 of the slot 1, which occupies four consecutive UL symbols. It is noted that the PUSCH transmission (or the "first nominal repetition") corresponding to the UL grant crosses the slot boundary between the slot 0 and the slot 1. Thus, the first nominal repetition may be divided into two actual PUSCH transmissions 502 and 504. In addition, because the number of nominal repetitions is configured as 2 by the gNB through an indicator, the second nominal PUSCH transmission 506 may span from the symbol 2 of the slot 1 to the symbol 5 of the slot 1 under the non-slot-based repetition scheme.

When the UE is configured with the DRX function (e.g., the UE is performing the DRX procedure), the UL RTT timer may be started by the UE's MAC entity if the UE receives the UL grant. As described above, the start timing of the UL RTT timer may be in the first symbol right after the end of the "first repetition" of the corresponding PUSCH transmission. From the UL grant perspective, the first repetition of a PUSCH transmission may be the first nominal PUSCH transmission (e.g., the PUSCH transmission from the symbol 12 of the slot 0 to the symbol 1 of the slot 1 in FIG. 5). However, from the actual transmission perspective, the first repetition of a PUSCH transmission may be the first actual PUSCH transmission (e.g., the actual PUSCH transmission 502). Thus, the operation of a UL RTT timer may be affected due to the different definitions of the "first repetition" of a PUSCH transmission.

From UL grant perspective: The UL resource for the first repetition of the corresponding PUSCH transmission may be dynamically granted by the gNB. As illustrated in FIG. 5, the UL resource indicated by the TDRA (the value of L is 4) may start from symbol 12 of the slot 0 to the symbol 1 of the slot 1. From the UL grant perspective, the start timing of the UL RTT timer may be at the first symbol after the end of the UL resource granted for the first repetition of the corresponding PUSCH transmission. That is, from the UL grant perspective, the UL RTT timer may start at the symbol 2 of the slot 1 (e.g., the Alt. a denoted in FIG. 5).

From actual transmission perspective: As illustrated in FIG. 5, the first nominal repetition of the PUSCH transmission is split into two actual PUSCH repetitions 502 and 504 due to the slot boundary between the slot 0 and slot 1. The first actual PUSCH repetition 502 may span from the symbol 12 of the slot 0 to the symbol 13 of the slot 0. The second actual PUSCH repetition 504 may span from the symbol 0 of the slot 1 to the symbol 1 of the slot 1. From the actual PUSCH transmission perspective, the start timing of a UL RTT timer may be at the first symbol right after the end of the first actual PUSCH repetition. That is, the UL RTT timer may start at the symbol 0 of the slot 1 (e.g., the Alt. b denoted in FIG. 5).

Examples of the corresponding Text Proposals (TPs) are shown in Tables 2, 3 and 4.

TABLE 2

| 5.7 Discontinuous Reception (DRX) |
| --- |
| When DRX is configured, the MAC entity shall:<br>1> if the MAC entity is in Active Time:<br>   2> monitor the PDCCH as specified in 3GPP TS 38.213;<br>   2> if the PDCCH indicates a UL transmission:<br>      3> start the drx-HARQ-RTT-TimerUL for the corresponding HARQ process in the first symbol after the end of the first repetition of the corresponding PUSCH transmission;<br>      3> stop the drx-RetransmissionTimerUL for the corresponding HARQ process. |

Note:
The exact timing of the first repetition is specified in the TS 38.214

TABLE 3

| 5.7 Discontinuous Reception (DRX) |
| --- |
| When DRX is configured, the MAC entity shall:<br>1> if the MAC entity is in Active Time:<br>   2> monitor the PDCCH as specified in 3GPP TS 38.213;<br>   2> if the PDCCH indicates a UL transmission:<br>      3> start the drx-HARQ-RTT-TimerUL for the corresponding HARQ process in the first symbolafter the end of the first repetition of the corresponding PUSCH transmission indicated by the ULgrant;<br>      3> stop the drx-RetransmissionTimerUL for the corresponding HARQ process. |

TABLE 4

| 5.7 Discontinuous Reception (DRX) |
| --- |
| When the DRX is configured, theMAC entity shall:<br>1> if the MAC entity is in Active Time:<br>   2> monitor the PDCCH as specified in 3GPP TS 38.213;<br>   2> if the PDCCH indicates a UL transmission:<br>      3> if the UL transmission is on a BWP (or serving cell) which configured withpusch-Aggregationfactor-urllc (as defined in Situation B);<br>      3> if the UL transmission is indicated with a number of nominal repetitions;or |

TABLE 4-continued 5.7 Discontinuous Reception (DRX)

3> if the UL transmission is corresponding to (a bundle of) non-slot-basedrepetition;
   4> start the drx-HARQ-RTT-TimerUL for the corresponding HARQ process in the first symbolafter the
    end of the first repetition of the corresponding PUSCH transmission indicated by the ULgrant;
   4> stop the drx-RetransmissionTimerUL for the corresponding HARQ process.
 3> else;
   4> start the drx-HARQ-RTT-TimerUL for the corresponding HARQ process in the first symbolafter the
    end of the first repetition of the corresponding PUSCH transmission;
   4>  stop the drx-RetransmissionTimerUL for the corresponding HARQ process.

In some implementations, a PUSCH transmission corresponding to a dynamic UL grant may cross at least one DL symbol and/or flexible symbol. This may also affect the operation of the UL RTT timer.

Referring to FIG. 4, the DCI may include a TDRA field that indicates a UL resource for a PUSCH transmission, where the values of S and L addressed by the TDRA field are 3 and 4, respectively. In addition, through an indicator from the gNB, the number of nominal repetitions is configured as 2. The UL resource scheduled by the gNB on the PUSCH may start at the symbol 3 of the slot 0 and occupy the following three UL symbols (i.e., occupying four UL symbols in total). As illustrated in FIG. 4, because the first nominal repetition corresponding to the UL grant crosses a DL symbol (i.e., the symbol 5 of the slot 0), the first nominal repetition is split into two actual PUSCH repetitions 402 and 404. In addition, the second nominal PUSCH transmission 406 may span from the symbol 8 of the slot 0 to the symbol 11 of the slot 1.

As described above, if a UL RTT timer is configured to be started at the first symbol right after the end of the "first repetition" of a PUSCH transmission, the start timing of the UL RTT timer may be different because the definition of the "first repetition" may be different from the UL grant perspective and the actual transmission perspective. For example, from the UL grant perspective, the first repetition of a PUSCH transmission may be the first nominal PUSCH transmission. From the actual transmission perspective, the first repetition of a PUSCH transmission may be the first actual PUSCH transmission. Details of the corresponding timer operations are described with reference to FIG. 4 below.

From UL grant perspective: The UL resource for the first nominal repetition of the corresponding PUSCH transmission may be dynamically granted by the gNB. As illustrated in FIG. 4, the UL resource indicated by the TDRA (where the value of L is indicated as 4) may include the symbols 3, 4, 6 and 7 of the slot 0. From the UL grant perspective, the start timing of the UL RTT timer may be at the first symbol right after the end of the UL resource granted for the first nominal repetition of the corresponding PUSCH transmission. As illustrated in FIG. 4, in one implementation, the UL RTT timer may start at the symbol 8 of the slot 0 (e.g., the timing denoted as "Alt. a" in FIG. 4).

From actual transmission perspective: As illustrated in FIG. 4, the first nominal repetition of the PUSCH transmission is split into two actual PUSCH repetitions 402 and 404 due to the slot boundary between the slot 0 and slot 1. The first actual PUSCH repetition 402 may span from the symbol 3 of the slot 0 to the symbol 4 of the slot 0. The second actual PUSCH repetition 404 may span from the symbol 6 of the slot 0 to the symbol 7 of the slot 0. From the actual transmission perspective, the start timing of a UL RTT timer may be at the first symbol right after the end of the first actual PUSCH repetition. As illustrated in FIG. 4, in one implementation, the UL RTT timer may start at the symbol 5 of the slot 0 (e.g., the timing denoted as "Alt. b" in FIG. 4).

Figure 6:
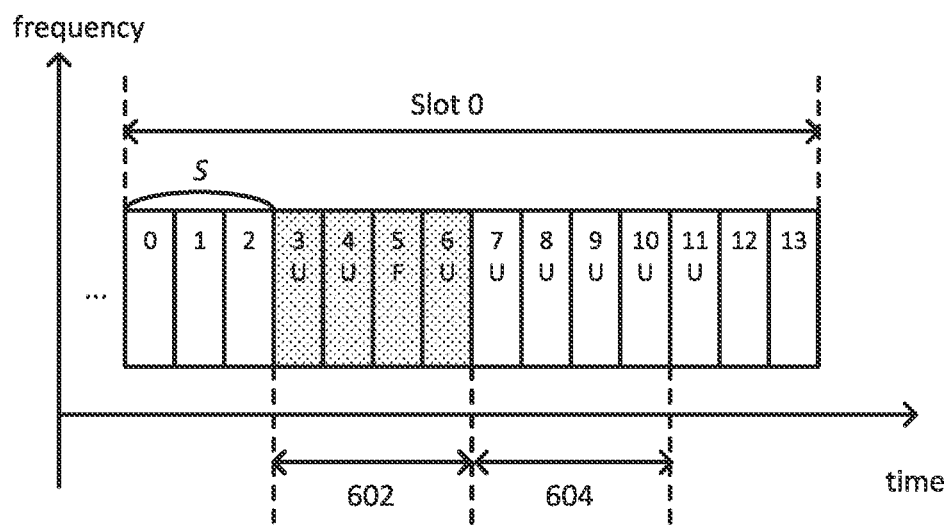
FIG. 6 is a diagram illustrating a repetition of a PUSCH transmission crossing a flexible symbol when the non-slot-based repetition scheme is applied, in accordance with an implementation of the present disclosure.

FIG. 6 is a diagram illustrating repetitions of a PUSCH transmission crossing a flexible symbol when the non-slot-based repetition scheme is applied, in accordance with an implementation of the present disclosure. As illustrated in FIG. 6, the dynamic scheduling of a PUSCH transmission 602 indicated by the DCI may cross a flexible symbol (which is denoted as "F" in FIG. 6). The flexible symbol may be dynamically configured as a DL symbol or a UL symbol via sfi-RNTI (as defined in the 3GPP Technical Specification (TS) 38.213). The DCI may include the TDRA field that indicates a UL resource for a PUSCH transmission, where the values of S and L addressed by the TDRA field are 3 and 4, respectively. In addition, through an indicator from the BS, the number of nominal repetitions is configured as 2. If the flexible symbol is used as a UL symbol, the first nominal PUSCH transmission 602 may span from the symbol 3 of the slot 0 to the symbol 6 of the slot 0, and the second nominal PUSCH 604 may span from the symbol 7 of the slot 0 to the symbol 10 of the slot 0. In this case, the UL RTT timer may start at first symbol right after the end of the first nominal PUSCH transmission 602 (e.g., the symbol 7 of the slot 0). If the flexible symbol is used as a DL symbol, the operation of the UL RTT timer may be the same as the case that is described with reference to FIG. 4 (either from the UL grant perspective or the actual transmission perspective).

Situation B: Method of Dynamic Indication of Number of Repetitions of PUSCH Transmission In some implementations, under the non-slot-based repetition scheme, a Dynamic Indication (DI) function that is able to let the gNB dynamically indicate to the UE the number of nominal repetitions for each dynamic scheduling (or let the gNB indicate to the UE the number of nominal repetitions per a dynamic scheduling basis) may be provided. In addition, an Enable/Disable DI (EDDI) mechanism that is used to enable or disable the DI function may also be provided.

Figure 7:
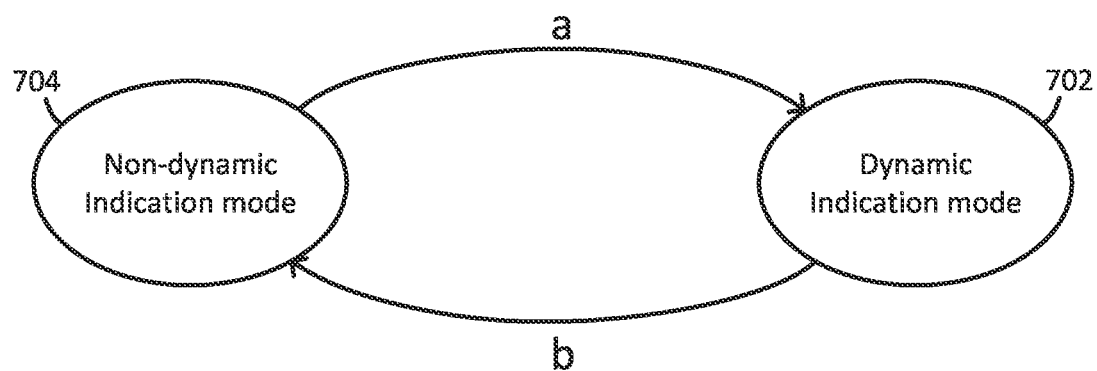
FIG. 7 is a diagram illustrating a user equipment (UE) switching between a dynamic indication mode and a non-dynamic indication mode, in accordance with an implementation of the present disclosure.

FIG. 7 is a diagram illustrating a UE switching between a dynamic indication mode and a non-dynamic indication mode, in accordance with an implementation of the present disclosure. As illustrated in FIG. 7, a UE may operate in the dynamic indication mode 702 or the non-dynamic indication mode 704. When the DL function is enabled by the gNB, the UE may operate in the dynamic indication mode 702, in which the BS (e.g., the gNB) may indicate to the UE the number of nominal repetitions for a PUSCH transmission via the dynamical scheduling signaling (e.g., the DCI and/or MAC CE signaling). By contrast, when the DL function is disabled, the UE may operate in the non-dynamic indication mode 704, in which the number of nominal repetitions for a PUSCH transmission may be predefined or preconfigured by the BS via the RRC signaling. Whether a UE should operate in the dynamic indication mode 702 or the non-dynamic indication mode 704 may be controlled by the EDDI mechanism. Examples of the UE behavior when a UE operates in the dynamic indication mode 702 or the non-dynamic indication mode 704 are described in following cases.

Case 1:

In some implementations, when a UE is in the dynamic indication mode, the number of nominal repetitions may be determined by an indicator from the gNB. For example, the indicator may be a DCI field that is contained in the DCI scheduling a UL grant corresponding to a PUSCH transmission. When the PUSCH transmission corresponding to the UL grant is configured to be performed under the non-slot-based repetition scheme, the number of nominal repetitions is determined by the indicator (e.g., the DCI field) received from the gNB. Examples of the operations on how a UE determines the number of nominal repetitions based on the received indicator are provided in the following sub-cases 1.1 to 1.12.

Sub-case 1.1: In some implementations, the indicator may be the bit-streams (content) of the DCI field that represents a value that explicitly or implicitly indicates the number of nominal repetitions for the PUSCH transmission corresponding to the UL grant scheduled by the DCI.

Sub-case 1.2: In some implementations, the indicator may be the bit-streams (content) of the DCI field that represents a value that explicitly or implicitly indicates a row index of a mapping table. The mapping table may be predefined (e.g., in the 3GPP TS) or preconfigured by the gNB via a DL RRC message. The mapping table may define the association/mapping between the row index and the number of nominal repetitions for a PUSCH transmission scheduled by the DCI.

Sub-case 1.3: In some implementations, the indicator may be the bit-streams (content) of the DCI field may represents a value that explicitly or implicitly indicates an element index of a repetition list (e.g., pusch-AggregationFactor-urllcList). The pusch-AggregationFactor-urllcList may be either predefined (e.g., in the 3GPP TS) or preconfigured by the gNB via a Downlink (DL) RRC message. The pusch-AggregationFactor-urllcList may contain one or more values (e.g., the R value(s) shown in Table 1) each indicating a specific number of nominal repetitions for a PUSCH transmission scheduled by the DCI. The value of the element index may indicate which of the (R) values in the repetition list should be applied by the UE for the PUSCH transmission. For example, when the value of the element index is 0, the values/parameters in the first element/row/entry of the pusch-AggregationFactor-urllcList may be selected/applied by the UE; when the value of the element index is 1, the values/parameters in the second element/row/entry of the pusch-AggregationFactor-urllcList may be applied/selected by the UE, and so on. In some implementations, the repetition list (e.g., the pusch-AggregationFactor-urllcList) may be configured by a BS per at least one of a UE basis, a serving cell group basis, a serving cell basis, a UL BWP basis, and a configured grant configuration basis.

Sub-case 1.4: In some implementations, the indicator may be the bit-streams (content) of the DCI field that represents a value that explicitly or implicitly indicates a coefficient or a parameter. In this case, the number of nominal repetitions for the PUSCH transmission corresponding to the UL grant scheduled by the DCI may be (or obtained by) the result of multiplying the value of the coefficient by the value of the PUSCH aggregation factor (e.g., pusch-AggregationFactor) or the value of the URLLC PUSCH aggregation factor (e.g., pusch-AggregationFactor-urllc). The pusch-Aggregation-Factor may be an existing parameter provided in the 3 GPP TS 38.331, while the pusch-AggregationFactor-urllc may be a newly-introduced parameter configured by the gNB to indicate to a UE the number of nominal repetitions. In some implementations, the pusch-AggregationFactor-urllc may be transmitted by a gNB via a DL RRC message. The pusch-AggregationFactor-urllc may be configured by a gNB per at least one of a UE basis, a serving cell group basis, a serving cell basis, a UL BWP basis, and a configured grant configuration basis. For example, in a case that the pusch-AggregationFactor-urllc is configured by the gNB per a UL BWP basis and the gNB schedules a PUSCH on a UL BWP, the UE may apply the pusch-AggregationFactor-urllc corresponding to the UL BWP to determine the number of nominal repetitions for the PUSCH transmission on the UL BWP if the gNB indicates that the PUSCH transmission should apply the non-slot-based repetition scheme.

Sub-case 1.5: The main difference between Sub-case 1.5 and 1.4 is that the number of nominal repetitions for the PUSCH transmission scheduled by the DCI may be (or obtained by) the result of adding the value of the coefficient and the value of the pusch-AggregationFactor (or the value of the pusch-AggregationFactor-urllc).

Sub-case 1.6: The main difference between Sub-case 1.6 and 1.4 is that the number of nominal repetitions for the PUSCH transmission corresponding scheduled by the DCI may be (or obtained by) the result of dividing the value of the coefficient by the value of the coefficient and the value of the pusch-AggregationFactor (or the value of the pusch-AggregationFactor-urllc). In some other implementations, the number of nominal repetitions for the PUSCH transmission may be (or obtained by) the result of dividing the value of the pusch-AggregationFactor (or the value of the pusch-AggregationFactor-urllc) by the value of the coefficient.

Sub-case 1.7: In some implementations, the indicator may be a DCI field (e.g., a zero-bit field) included in the DCI, if the DCI is used to schedule a PUSCH on a specific serving cell group/serving cell/UL BWP. In this case, the DCI field may be only applied to a PUSCH transmission on certain specific serving cell group(s)/serving cell(s)/UL BWP(s).

Sub-case 1.8: In some implementations, the indicator (e.g., the DCI field) may only exist in the DCI with CRC bits scrambled by a specific type of a UE-specific RNTI. In another implementation, the indicator (e.g., the DCI field) may be applied by the UE only when the indicator is in the DCI with CRC bits scrambled by a specific type of (UE-specific) RNTI.

Sub-case 1.9: In some implementations, the mapping table and the pusch-AggregationFactor-urllcList described in the above sub-cases may be configured per a serving cell group/serving cell/UL BWP basis. In this case, the number of nominal repetitions of a PUSCH transmission on a serving cell group/serving cell/UL BWP may be determined by the mapping table or the pusch-AggregationFactor-urllcList corresponding to the serving cell group/the serving cell/the UL BWP. In another example, the PUSCH transmission scheduled by the DCI received on a serving cell group/serving cell/UL BWP may apply the mapping table or the AggregationFactor-urllcList of the serving cell group/serving cell/UL BWP.

Sub-case 1.10: In some implementations, the number of bits of the DCI field contained in the DCI may be determined by an RRC configuration. For example, the DCI field may be determined by the number of elements included in the pusch-AggregationFactor-urllcList. For example, the DCI field may be determined as [$\log_2$ (the number of elements of the pusch-AggregationFactor-urllcList)].

Sub-case 1.11: In some implementations, the DCI field may be contained (only) in the DCI with the CRC bits scrambled by the CS-RNTI that is applied by the gNB to activate a configured grant type II configuration (e.g., which is provided in the 3 GPP TS 38.331).

Sub-case 1.12: In some implementations, the DCI field may be contained (only) in an Information Element (IE) of a configured grant configuration (e.g., the ConfiguredGrantConfig IE) that is applied by the gNB to activate a configured grant type I configuration (e.g., which is provided in the 3GPP TS 38.331).

Case 2:

In some implementations, when a UE is in the dynamic indication mode 702, the gNB may indicate to the UE to switch to the non-dynamic indication mode 704 (e.g., as denoted as the path b in FIG. 7) via specific indication(s). Examples of the indications are described in the following sub-cases.

Sub-case 2.1: In some implementations, a BS (e.g., a gNB) may indicate to a UE whether to operate in the dynamic indication mode 702 or the non-dynamic indication mode 704 by transmitting DCI to the UE. In some implementations, the DCI may have a specific DCI format. For example, after receiving/detecting the specific DCI format, the UE may operate in the dynamic indication mode 702. By contrast, if another DCI format is received/detected by the UE, the UE may operate in the non-dynamic indication mode 704.

Sub-case 2.2: In some implementations, a BS (e.g., a gNB) may apply a DCI field (indication) contained in the DCI to indicate to a UE whether to operate in the dynamic indication mode 702 or the non-dynamic indication mode 704. In an implementation, the DCI field may be a one-bit field. For example, if the content of the DCI field is "0," the UE may operate in the dynamic indication mode 702. By contrast, if the content of the DCI field is "1," the UE may operate in the non-dynamic indication mode 704.

Sub-case 2.3: The main difference between Sub-case 2.3 and Sub-case 2.2 is that whether a UE should operate in the dynamic indication mode 702 or the non-dynamic indication mode 704 may be indicated by the specific value of the DCI field introduced in Case 1 of Situation 2. For example, when the content/value of the DCI field is set to a first value by the gNB, the UE may switch to the non-dynamic indication mode 704 (e.g., as denoted as the path b in FIG. 7); when the content/value of the DCI field is set to a second value by the gNB, the UE may switch from the non-dynamic indication mode 704 to the dynamic indication mode 702 (e.g., as denoted as the path a in FIG. 7).

Sub-case 2.4: In some implementations, the gNB may indicate to a UE whether the UE should operate in the dynamic indication mode 702 or the non-dynamic indication mode 704 via a MAC Control Element (CE). For example, one or more fields contained in the MAC CE may be used to indicate to a UE whether to operate in the dynamic indication mode 702 or the non-dynamic indication mode 704 for each serving cell group/serving cell/BWP/UL BWP/PUSCH. In some implementations, the UE may operate in the dynamic indication mode 702 or the non-dynamic indication mode 704 by default to perform a PUSCH transmission on each serving cell group/serving cell/UL BWP. For example, after being configured with a serving cell group and before receiving a MAC CE corresponding to the serving cell group, a UE may perform the PUSCH transmission on the serving cell group in either the dynamic indication mode 702 or the non-dynamic indication mode 704 by default. For example, after being configured with a serving cell and before receiving a MAC CE corresponding to the serving cell, a UE may perform the PUSCH transmission on the serving cell group in either the dynamic indication mode 702 or the non-dynamic indication mode 704 by default. For example, after being configured with a UL BWP and before receiving a MAC CE corresponding to the UL BWP, a UE may perform the PUSCH transmission on the UL BWP in the dynamic indication mode 702 or the non-dynamic indication mode 704 by default.

Sub-case 2.5: The main difference between Sub-case 2.4 and Sub-case 2.3 is that the gNB may indicate to the UE to operate in the dynamic indication mode 702 via a first MAC CE and indicate to the UE to operate in the non-dynamic indication mode 704 via a second MAC CE. One or more fields contained in the first/second MAC CE may be used to indicate to the UE whether to operate in the dynamic indication mode 702 or the non-dynamic indication mode 704 for each serving cell group/serving cell/BWP/UL BWP/PUSCH.

Sub-case 2.6: In some implementations, the gNB may indicate to a UE whether to operate in the dynamic indication mode 702 or the non-dynamic indication mode 704 via a specific RNTI. The specific RNTI may be configured by the gNB per a serving cell group/serving cell/UL BWP basis via the DL RRC message(s). For example, when receiving the DCI with the CRC bits scrambled by the specific RNTI, the UE may perform the PUSCH transmission on the serving cell group/serving cell/UL BWP in the dynamic indication mode 702 until the UE receives the DCI with the CRC bits scrambled by the specific RNTI again. In some implementations, the UE may operate in the dynamic indication mode 702 or the non-dynamic indication mode 704 by default to perform a PUSCH transmission on each serving cell group/serving cell/UL BWP. For example, after being configured with a serving cell group and before receiving the DCI with CRC bits scrambled by the specific RNTI corresponding to the serving cell group, a UE may perform the PUSCH transmission on the serving cell group in either the dynamic indication mode 702 or the non-dynamic indication mode 704 by default. For example, after being configured with and activating a serving cell and before receiving the DCI with CRC bits scrambled by the specific RNTI corresponding to the serving cell, a UE may perform the PUSCH transmission on the serving cell in either the dynamic indication mode 702 or the non-dynamic indication mode 704 by default. For example, after being configured with and activating a UL BWP and before receiving the DCI with CRC bits scrambled by the specific RNTI corresponding to the UL BWP, a UE may perform the PUSCH transmission on the serving cell in either the dynamic indication mode 702 or the non-dynamic indication mode 704 by default.

Sub-case 2.7: The main difference between Sub-case 2.6 and Sub-case 2.7 is that the gNB may indicate to the UE to operate in the dynamic indication mode 702 via a specific RNTI and indicate to the UE to operate in the non-dynamic indication mode 704 via another specific RNTI.

Sub-case 2.8: In some implementations, a default mode (e.g., the dynamic indication mode 702 or the non-dynamic indication mode 704) of a serving cell group/serving cell/UL BWP may be configured by the gNB via the DL RRC message(s). For example, before receiving the corresponding MAC CE or DCI, the UE may perform the PUSCH transmission on the serving cell group/serving cell/UL BWP in the default mode.

Sub-case 2.9: In some implementations, a UE may be configured with a timer. When receiving an indication (e.g., a MAC CE or the DCI or an RNTI) that indicates to the UE to switch to an operation mode (e.g., the dynamic indication mode 702 or the non-dynamic indication mode 704) that is different from the default mode, the UE may start the timer. When the timer expires, the UE may switch from the operation mode to the default mode automatically without receiving further indication from the gNB. In some implementations, the UE may restart the timer when receiving a (specific) UL grant. In some implementations, the timer may be maintained/configured per a serving cell group/serving cell/UL BWP basis. The length of the timer may be preconfigured by the gNB via a DL RRC message.

Figure 8:
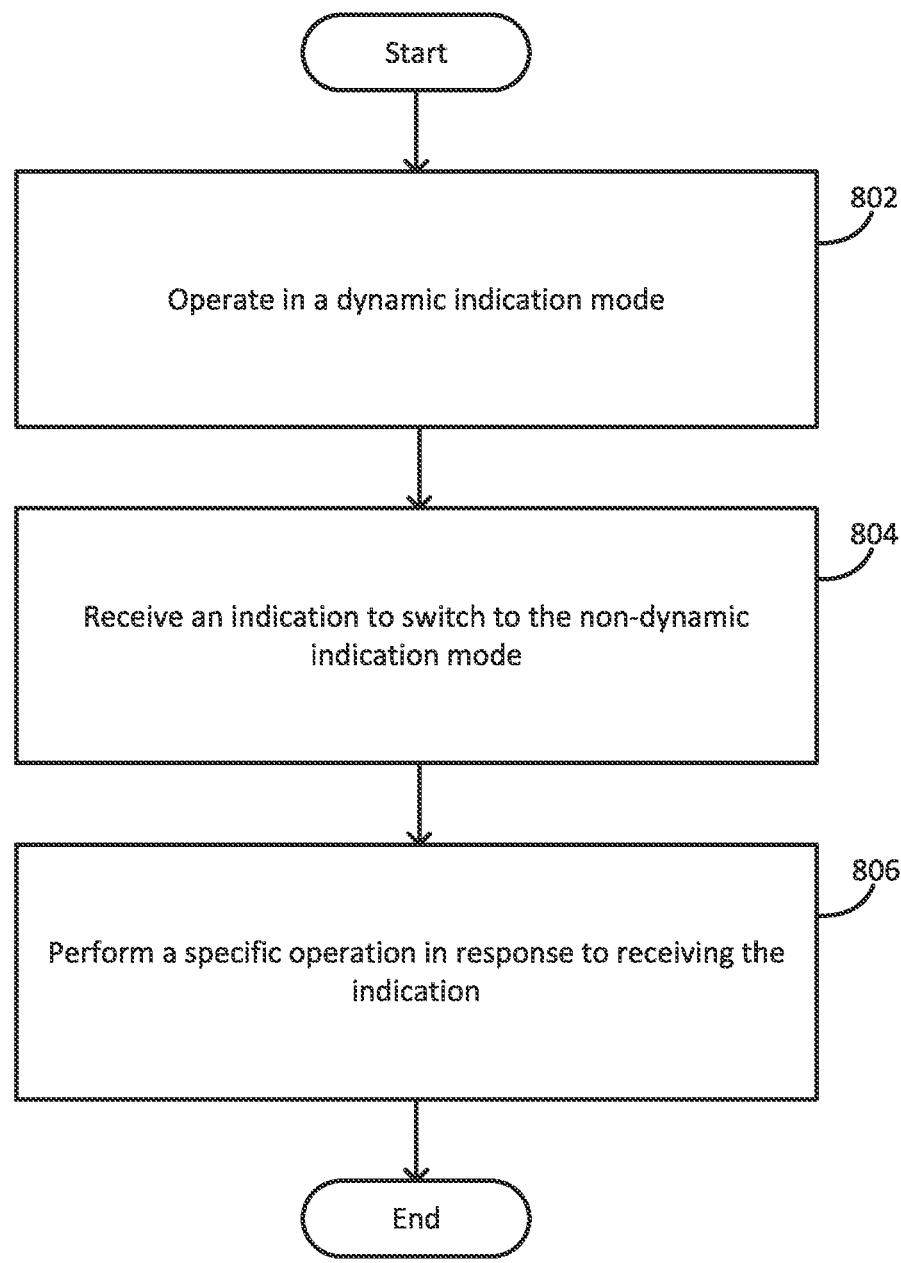
FIG. 8 illustrates a flowchart of a procedure performed by a UE, in accordance with an implementation of the present disclosure.

Case 3:

FIG. 8 illustrates a flowchart of a procedure performed by a UE, in accordance with an implementation of the present disclosure. As illustrated in FIG. 8, in action 802, a UE may operate in the dynamic indication mode. In action 804, the UE may receive an indication to switch to the non-dynamic indication mode. In action 806, the UE may perform a specific operation in response to receiving the indication. Examples of the specific operation are described in the following sub-case(s).

Sub-case 3.1: In some implementations, the DCI may contain a first DCI field that indicates to the UE to operate in the dynamic indication mode. In this case, the number of nominal repetitions of a PUSCH transmission may be indicated by a second DCI field such as an existing DCI field (e.g., which is provided in the current 3GPP TS 38.212). For example, when an existing DCI field is used as the second DCI field, the content of the existing DCI field may be changed to indicate to the UE the number of nominal repetitions for the PUSCH transmission corresponding to the UL grant scheduled by the DCI. In addition, details of how the existing DCI field indicates to the UE to the number of nominal repetitions may be implemented based on the implementation(s) described in Case 1 of Situation B. On the other hand, if the first DCI field indicates to the UE to operate in the non-dynamic indication mode, the second DCI field may remain the same as how it is defined in the 3GPP TS 38.212. In some implementations, the first and second DCI fields may be contained in the DCI that schedules the UL grant. In this case, if the UE is configured to perform a PUSCH transmission corresponding to the UL grant based on the non-slot-based repetition scheme, the number of nominal repetitions for the PUSCH transmission may be determined by the first DCI field and the second DCI field received from the gNB. For example, the first DCI field may (implicitly) indicate whether the PUSCH transmission should be performed based on a PUSCH repetition scheme, and the second DCI field may explicitly indicate a row/entry in a TDRA table (e.g., via a row/entry index for the TDRA table).

Sub-case 3.2: In some implementations, when operating in the non-dynamic indication mode, a UE may fallback to apply the slot-based repetition scheme to perform a PUSCH transmission. The number of PUSCH repetitions for the PUSCH transmission may be, for example, configured by the pusch-Aggregationfactor as defined in the 3GPP TS 38.331.

Sub-case 3.3: In some implementations, when operating in the non-dynamic indication mode, a UE may apply the non-slot-based repetition scheme to perform a PUSCH transmission. The number of nominal repetitions for the PUSCH transmission may be, for example, a fixed value configured by the pusch-Aggregationfactor-urllc.

Case 4: In some implementations, the number of nominal repetitions may be implicitly indicated by a TDRA index (e.g., a row/entry index that indicates a row/entry included in a TDRA table). One or more non-slot-based repetition scheme-specific TDRA tables at the UE may be pre-configured by the gNB or predefined in the 3GPP TS. For example, as shown in Table 1, each row/entry in the TDRA table may define the mapping/association between a specific number of nominal repetitions (e.g., the R value) and a set of parameters, including at least one of $K_2$, S and L, for configuring a PUSCH transmission. In some implementations, the TDRA tables configured in the UE may be applied to the Cyclic Prefix (CP) modes (e.g., the normal CP or the extended CP) different from each other. Once a TDRA value (e.g., a row/entry index of the TDRA table) is received, the UE may determine the R value and the set of parameters (e.g., the values of $K_2$, L and/or S) to be applied to a PUSCH transmission according to the corresponding TDRA table. In some implementations, a UE may be configured with at least one first TDRA table configured for the non-slot-based repetition scheme and at least one second TDRA table configured for the slot-based repetition scheme. In some other implementations, a UE may be configured with at least one first TDRA table configured for the dynamic indication mode and at least one second TDRA table configured for the non-dynamic indication mode.

Sub-case 4.1: In some other implementations, a TDRA table may include one or more indicators, each of which may not directly represent the number of nominal repetitions for a PUSCH transmission. Instead, each indicator may be associated with (or indicate) the number of nominal repetitions. In this case, a UE may determine the number of nominal repetitions based on the indicator(s). For example, a UE may determine that the number of nominal repetitions is "2" when the value of the indicator is "1" and determine that the number of nominal repetitions is "4" when the value of the indicator is "2" based on certain predefined/preconfigured mapping rules.

Case 5:

In some implementations, a gNB may configure a parameter pusch-AggregationFactor-urllc for a specific UL BWP (s) and configure another parameter pusch-AggregationFactor-urllc for a serving cell. In this case, the UE may know that the PUSCH transmission on the specific UL BWP (which is configured with the pusch-AggregationFactor-urllc) should be performed based on the non-slot-based repetition scheme by setting the number of nominal repetitions as the value of the pusch-AggregationFactor-urllc configured for the specific UL BWP. By contrast, if the PUSCH transmission is on a UL BWP which is not configured with the pusch-AggregationFactor-urllc, the UE may perform the PUSCH transmission under the non-slot-based repetition scheme by setting the number of nominal repetitions as the value of the pusch-AggregationFactor-urllc configured for the serving cell of the UL BWP.

Sub-case 5.1: In some implementations, similar to Case 5, a gNB may configure a parameter pusch-AggregationFactor-urllc for a specific serving cell(s) and configure another parameter pusch-AggregationFactor-urllc for a serving cell group. In this case, the UE may know that the PUSCH transmission on the serving cell (which is configured with the pusch-AggregationFactor-urllc) should be performed based on the non-slot-based repetition scheme by setting the number of nominal repetitions as the value of the pusch-AggregationFactor-urllc configured for the specific serving cell. By contrast, if the PUSCH transmission is on a serving cell which is not configured with the pusch-AggregationFactor-urllc, the UE may perform the PUSCH transmission under the non-slot-based repetition scheme by setting the number of nominal repetitions for the PUSCH transmission as the value of the pusch-AggregationFactor-urllc configured for the serving cell group of the serving cell.

Figure 9:
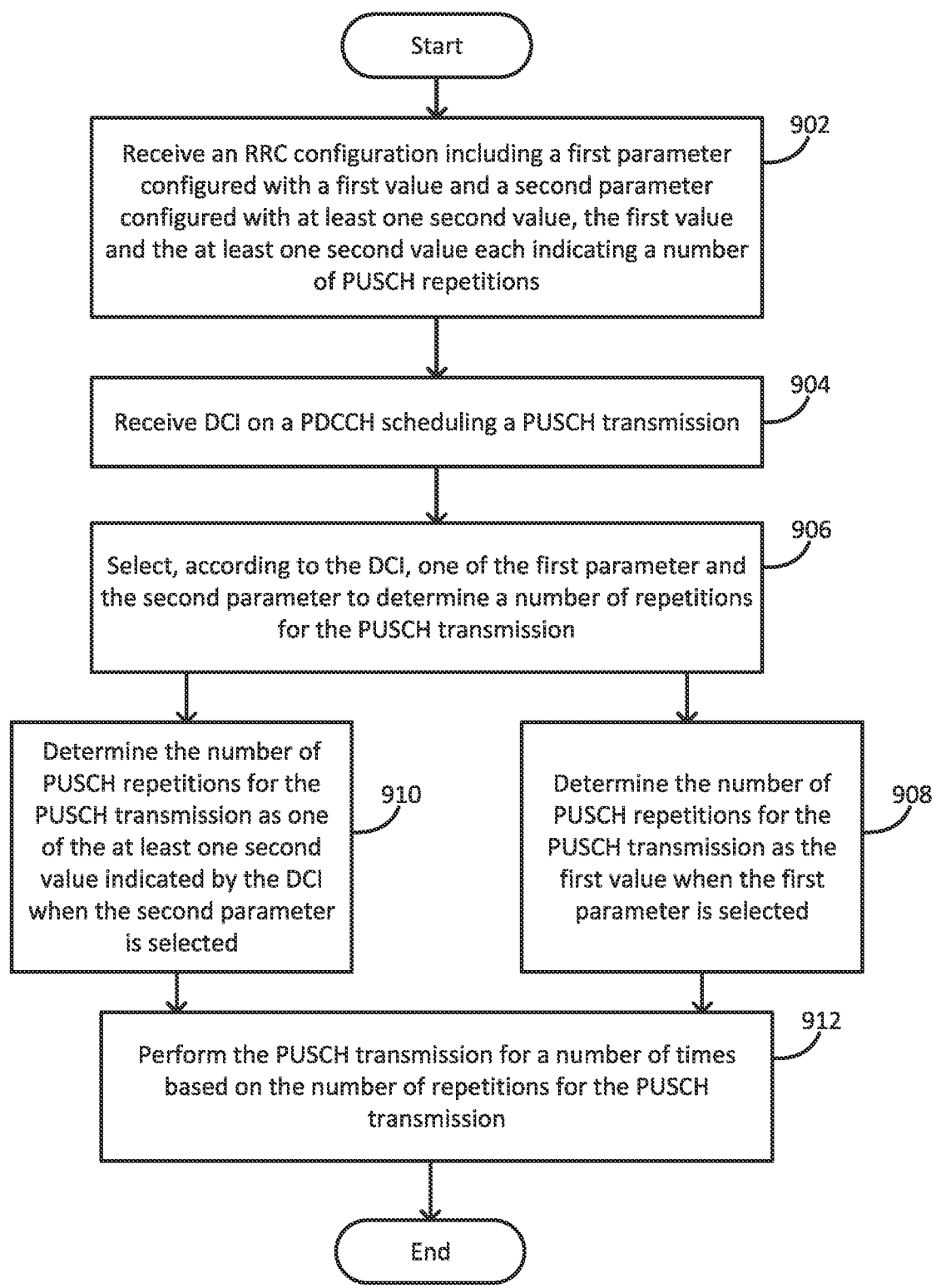
FIG. 9 illustrates a flowchart of a procedure performed by a UE, in accordance with an implementation of the present disclosure.

FIG. 9 illustrates a flowchart of a procedure performed by a UE, in accordance with an implementation of the present disclosure. It should be noted that although actions 902, 904, 906, 908, 910 and 912 are delineated as separate actions represented as independent blocks in FIG. 9, these separately delineated actions should not be construed as necessarily order dependent. The order in which the actions are performed in FIG. 9 is not intended to be construed as a limitation, and any number of the described blocks may be combined in any order to implement the method, or an alternate method. Moreover, one or more of actions 902, 904, 906, 908, 910 and 912 may be omitted in some implementations of the present disclosure.

As illustrated in FIG. 9, in action 902, a UE may receive an RRC configuration including a first parameter configured with a first value and a second parameter configured with at least one second value. The first value and each of the second value(s) each indicating a number of PUSCH repetitions. In some implementations, the first parameter and the second parameter may correspond to different Information Elements (IEs) in the RRC configuration, where the first parameter may be directed to a single first value, and the second parameter may be directed to (or may be) a repetition list including one or more second values (e.g., the R value(s) illustrated in Table 1). In some implementations, the first parameter and the second parameter may be configured per a serving cell group/serving cell/BWP basis.

In action 904, the UE may receive DCI on a PDCCH scheduling a PUSCH transmission.

In action 906, the UE may select, according to the DCI, the first parameter or the second parameter to determine the number of PUSCH repetitions for the PUSCH transmission. In some implementations, the UE may select the first parameter or the second parameter based on the DCI field/DCI format of the received DCI. For example, because each DCI format may have its own corresponding DCI fields, when performing blind decoding, the UE may determine the DCI format of the DCI by checking whether the DCI can be decoded successfully with a set of DCI fields. In this case, when the DCI has a DCI format associated with the second parameter and includes an index indicating one of the second value(s), a UE may select the second parameter to determine the number of PUSCH repetitions for the PUSCH transmission. In some implementations, the second parameter (e.g., a repetition list) may define an association between the index (e.g., a row/entry index of the repetition list) and a set of values including a third value (e.g., the value of S) indicating a starting symbol of the PUSCH transmission and a fourth value (e.g., the value of L) indicating a number of consecutive symbols of the PUSCH transmission.

In action 908, when the first parameter is selected, the UE may determine the number of PUSCH repetitions for the PUSCH transmission as the first value. For example, if the first parameter is configured with a first value of "2," the UE may determine that the number of PUSCH repetitions for the PUSCH transmission is 2. In another example, the first value may not directly represent the number of PUSCH repetitions for the PUSCH transmission, but may have a preconfigured/predefined mapping relationship with the number of PUSCH repetitions for the PUSCH transmission (e.g., the first value may be used as an index of the number of PUSCH repetitions for the PUSCH transmission). In this case, the UE may determine the number of PUSCH repetitions for the PUSCH transmission based on the first value and the preconfigured/predefined mapping relationship.

In action 910, when the second parameter is selected, the UE may determine the number of PUSCH repetitions for the PUSCH transmission as one of the at least one second value indicated by the DCI. For example, if the second parameter is configured with several second values such as "2," "3" and "4," and one of the second values (e.g., "3") is indicated by the DCI (e.g., by the DCI field contained in the DCI), the UE may determine that the number of PUSCH repetitions for the PUSCH transmission is 3. In another example, the second value may not direct represent the number of PUSCH repetitions for the PUSCH transmission, but may have a preconfigured/predefined mapping relationship with the number of PUSCH repetitions for the PUSCH transmission (e.g., the second value may be used as an index of the number of PUSCH repetitions for the PUSCH transmission). In this case, the UE may determine the number of PUSCH repetitions for the PUSCH transmission based on the second value and the preconfigured/predefined mapping relationship.

In action 912, the UE may perform the PUSCH transmission for a number of times (e.g., the UE may repeat the PUSCH transmission among a set of consecutive UL symbols) based on the number of PUSCH repetitions for the PUSCH transmission (e.g., the number of times the PUSCH transmission is performed may be determined by (or equal to) the number of PUSCH repetitions for the PUSCH transmission). For example, if the second parameter is selected and the indicated second value included in the second parameter (e.g., the repetition list) is "4," the UE may determine that the number of PUSCH repetitions for the PUSCH transmission scheduled by the DCI is 4 (if the second value directly represent the number of PUSCH repetitions for the PUSCH transmission). In this case, the UE may perform an initial transmission of the scheduled PUSCH/TB, followed by repeating the initial transmission of the scheduled PUSCH/TB three times. So, the total number of performing the PUSCH/TB transmission by the UE is 4 (i.e., one initial PUSCH/TB transmission (or the "first PUSCH/TB repetition")+three repeated PUSCH/TB transmissions (or the "second, third and fourth PUSCH/TB repetitions")).

In some implementations, each (sub-)case described above may be applied when one or more specific conditions are satisfied. For example, the specific conditions may include:

(a) the UE is configured with a specific Access Stratum (AS) layer function (e.g., a Packet Data Convergence Protocol (PDCP) duplication function);

(b) the UE is configured with a specific AS layer function (e.g., a PDCP duplication function), and the specific AS layer function is activated; and (c) the UE is configured with an RRC connection with two or more gNBs/eNBs.

The following provides the non-limiting descriptions of certain terms.

Cell: in some implementations, a cell (e.g., a PCell or an SCell) may be a radio network object that may be uniquely identified by a UE through the corresponding identification information, which may be broadcast by a UTRAN access point in a geographical area. A cell may be operated in a Frequency Division Duplex (FDD) or a Time Division Duplex (TDD) mode.

Serving Cell: in some implementations, for a UE operating in the RRC CONNECTED state and not configured with Carrier Aggregation (CA)/Dual Connectivity (DC), the UE may be configured with only one serving cell (e.g., a PCell). For a UE operating in the RRC_CONNECTED state and configured with CA/DC, the UE may be configured with multiple serving cells including an SpCell and one or more SCells.

CA: in some implementations, in case of CA, two or more Component Carriers (CCs) may be aggregated. A UE may simultaneously receive or transmit signals on one or more of the CCs depending on its capabilities. CA may be supported with both the contiguous and non-contiguous CCs. When CA is applied, the frame timing and the System Frame Number (SFN) may be aligned across cells that are aggregated. In some implementations, the maximum number of configured CCs for a UE may be 16 for DL and 16 for UL. When CA is configured, the UE may have only one RRC connection with the network. During the RRC connection establishment/re-establishment/handover, one serving cell may provide the Non-Access Stratum (NAS) mobility information, and at RRC connection re-establishment/handover, one serving cell may provide the security input, where the serving cell may be referred to as the PCell. Depending on UE capabilities, SCells may be configured to form together with the PCell as a set of serving cells for the UE. The configured set of serving cells for a UE therefore always consists of one PCell and one or more SCells.

Configured Grant: in some implementations, for configured grant type 1, the RRC entity may directly provide the configured uplink grant (including the periodicity). For configured grant type 2, the RRC entity may define the periodicity of the PUSCH resources of the CG, while the PDCCH addressed to the Configured Scheduling-RNTI (CS-RNTI) may either signal and activate the configured uplink grant or deactivate it. That is, the PDCCH addressed to the CS-RNTI may indicate that the configured uplink grant can be reused according to the periodicity defined by the RRC entity, until the configured unlink grant is deactivated. When a configured uplink grant is active, a UL transmission according to the configured uplink grant may be performed if the UE cannot find its C-RNTI/CS-RNTI/MCS-C-RNTI on the PDCCH(s). If the UE receives its C-RNTI/CS-RNTI/MCS-C-RNTI on the PDCCH(s), the PDCCH allocation may override the configured uplink grant. In some implementations, the usage of MCS-C-RNTI may be equivalent to that of C-RNTI in the MAC procedures (except for the C-RNTI MAC CE).

HARQ: in some implementations, a HARQ process may be used to ensure the transmissions between two or more peer entities at Layer 1 (e.g., PHY layer). A single HARQ process may support a TB when the PHY layer is not configured for DL/UL spatial multiplexing. When the PHY layer is configured for the DL/UL spatial multiplexing, a single HARQ process may support one or multiple TBs. Each serving cell may correspond to a HARQ entity, where each HARQ entity may support a parallel processing of the DL and UL HARQ processes.

HARQ-Acknowledgement (HARQ-ACK): in some implementations, a HARQ-ACK may include a 1-bit indicator, where the HARQ-ACK may be a Negative Acknowledgement (NACK) when the bit value of the indicator is "0" and may be a positive Acknowledgement (ACK) when the bit value of the indicator is "1."

Timer: in some implementations, the MAC entity of the UE may setup one or more timers for individual purposes, such as triggering uplink signaling retransmissions or limiting uplink signaling retransmission periods. When a timer (e.g., the timers described in various implementations of the present application) maintained by the MAC entity starts, the timer may start running until it stops or expires. In addition, the timer may not run when it does not start. A timer may start when it is not running. Also, a timer may restart when it is running. In some implementations, a timer may always start or restart from an initial value, where the initial value can be, but is not limited to, configured by the gNB via downlink RRC signaling.

BWP: in some implementations, a BWP may be a subset of the total cell bandwidth of a cell. By configuring one or more BWPs to the UE and informing the UE that which of the configured BWPs is the currently the active BWP, Bandwidth Adaptation (BA) may be achieved. To enable the BA mechanism on the PCell, the gNB may configure the UE with one or more UL and DL BWPs. In case of CA, to enable the BA mechanism on SCells, the gNB may configure the UE with one or more DL BWPs at least (which means that there may be no UL BWPs configure to the UE). For the PCell, the initial BWP may be the BWP used for initial access. For the SCell(s), the initial BWP may be the BWP configured for the UE to first operate during the SCell activation process. In some implementations, the UE may be configured with a First-Active UL BWP by a firstActiveUplinkBWP IE field. If the First-Active UL BWP is configured for an SpCell, the firstActiveUplinkBWP IE field may contain the ID of the UL BWP to be activated when the RRC (re)configuration is performed. If the field is absent, the RRC (re)configuration may not trigger a BWP switch. If the First-Active uplink BWP is configured for an SCell, the firstActiveUplinkBWP IE field may contain the ID of the UL BWP to be used upon the MAC-activation of an SCell.

PDCCH: in some implementations, a gNB may dynamically allocate resources to the UE via a C-RNTI/MCS-C-RNTI/CS-RNTI on one or more PDCCHs. The UE may always monitor the PDCCH(s) in order to find possible assignments when its DL reception is enabled (e.g., activity governed by DRX when configured). In some implementations, when CA is configured, the same C-RNTI may be applied to all serving cells.

Physical Downlink Shared Channel (PDSCH)/PUSCH: in some implementations, a PDCCH may be used to schedule DL transmissions on a PDSCH and UL transmissions on a PUSCH.

Time Alignment Timer: in some implementations, the RRC entity may configure the initial value of a time alignment timer. The time alignment timer (e.g., timeAlignmentTimer) may be used for the maintenance of UL time alignment, where the time alignment timer may be configured and maintained per a Timing Advance Group (TAG) basis. The time alignment timer may be used to control the time length that the MAC entity considers the serving cells belonging to the associated TAG to be UL time aligned.

Start and Length Indicator (SLIV): in some implementations, the SLIV may be used for the time domain allocation for a PUSCH/PDSCH. The SLIV may define the starting symbol and the number of consecutive symbols for a PUSCH/PDSCH allocation.

TB: The data from the upper layer (e.g., MAC layer/entity) to the PHY layer may be usually referred to as a TB(s).

It is noted that the terms, definitions and abbreviations described in the present disclosure may come from the existing documentation (European Telecommunications Standards Institute (ETSI), International Telecommunication Union (ITU), and etc.) or newly created by the 3GPP experts.

In some implementations, a Reference Signal (RS) ID may be replaced by any other ID(s) which is used for explicitly or implicitly indicating a new beam to the gNB.

In some implementations, a DL RRC message may be an RRC reconfiguration message (e.g., RRCReconfiguration), an RRC resume message (e.g., RRCResume), an RRC reestablishment message (e.g., RRCReestablishment), an RRC setup message (e.g., RRCSetup), or any other DL unicast RRC message.

In some implementations, a beam may be considered as a spatial domain filter. For example, a wireless device (e.g., a UE) may apply the spatial filter in an analog domain by adjusting the phase and/or amplitude of a signal before transmitting the signal through a corresponding antenna element. In another example, the spatial filter may be applied in a digital domain by Multi-Input Multi-Output (MIMO) techniques in the wireless communication system. For example, a UE may perform a PUSCH transmission by using a specific beam which is a specific spatial/digital domain filter. In some implementations, a beam may be represented by (or corresponding to) an antenna, an antenna port, an antenna element, a group of antennas, a group of antenna ports, or a group of antenna elements. In some implementations, a beam may be formed by (or associated with) a specific RS resource. The beam may be equivalent to a spatial domain filter through which the Electromagnetic (EM) waves are radiated.

In some implementations, the transmitted signaling means that the MAC CE/MAC Protocol Data Unit (PDU)/layer 1 signaling/higher layer signaling that contains (or corresponds to) the signaling is starting to be transmitted, completely transmitted, or has already delivered to the corresponding HARQ process/buffer for transmission. In some implementations, the transmitted signaling means that the corresponding HARQ-ACK feedback of a specific MAC PDU is received, where the specific MAC PUD may include the MAC CE/layer 1 signaling/higher layer signaling that contains (or corresponds to) the signaling. In some implementations, the transmitted signaling means that the MAC CE/MAC PDU corresponding to the signaling is built or generated.

In some implementations, a HARQ-ACK feedback may be implemented by the DCI format 0_0, 0_1 or other DCI format(s) of the DCI received by the UE from the gNB on a PDCCH. In some implementations, the received DCI may contain a New Data Indicator (NDI) that may be set to a specific value (e.g., 1). In addition, the DCI may indicate a HARQ process ID which is the same as the HARQ process ID applied by (or indicated to) a HARQ process of the MAC PDU (carrying the Beam Failure Recovery request (BFRQ) MAC CE) transmission.

In some implementations, a PDCCH may be transmitted by the gNB to the UE, and the UE may receive the PDCCH from the gNB. Similarly, a PDSCH may be transmitted by the gNB to the UE, and the UE may receive the PDSCH from the gNB. For UL transmissions, a PUSCH/PUCCH may be transmitted by the UE to the gNB, and the PUSCH/Physical Uplink Control Channel (PUCCH) may be received by the gNB.

In some implementations, a PDSCH/PUSCH transmission may span multiple symbols in the time domain, where the time duration of a PDSCH/PUSCH (transmission) may be a time interval that starts from the beginning of the first symbol of the PDSCH/PUSCH (transmission) and end at the end of the last symbol of the PDSCH/PUSCH (transmission).

In some implementations, the terms "interrupt," "stop," "cancel," and "skip" may be interchangeable.

Figure 10:
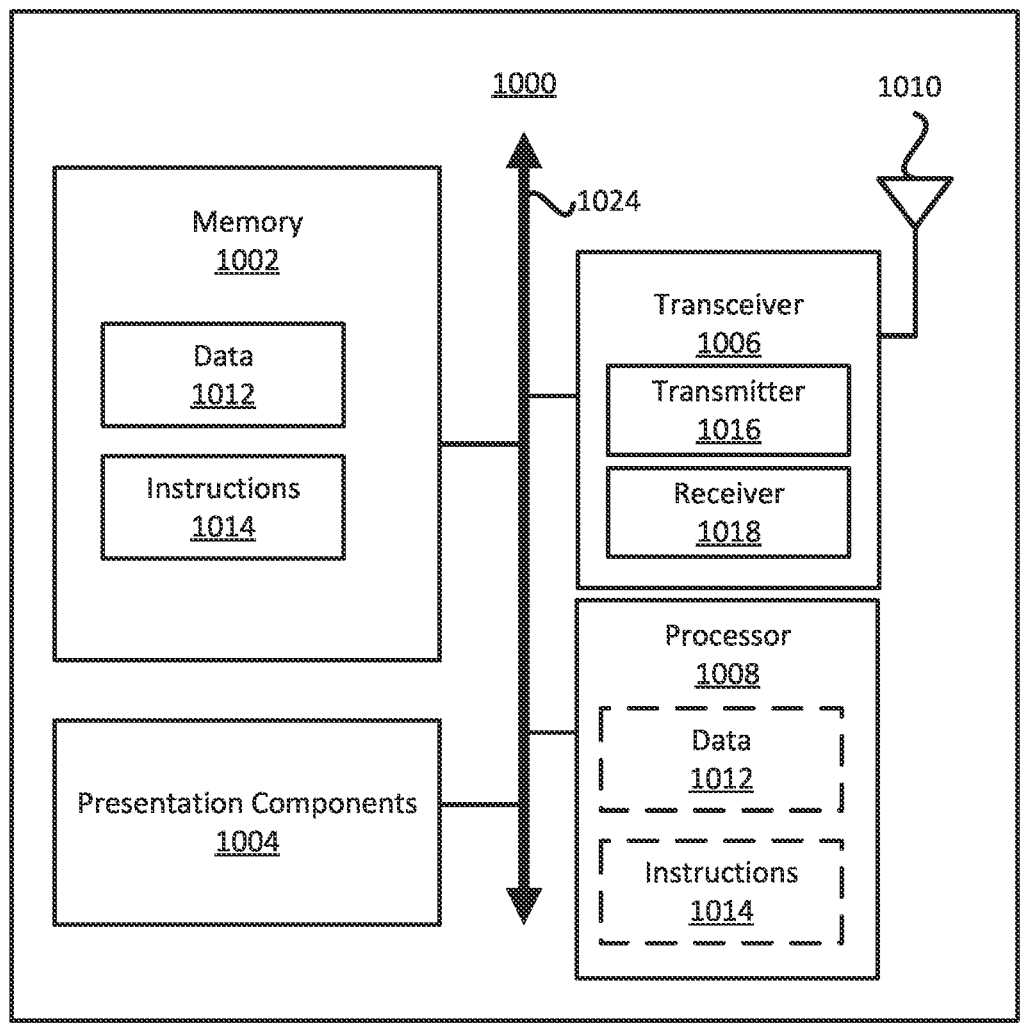
FIG. 10 illustrates a block diagram of a node for wireless communication, in accordance with various aspects of the present disclosure.

FIG. 10 illustrates a block diagram of a node for wireless communication, in accordance with various aspects of the present disclosure. As illustrated in FIG. 10, a node 1000 may include a transceiver 1006, a processor 1008, a memory 1002, one or more presentation components 1004, and at least one antenna 1010. The node 1000 may also include an RF spectrum band module, a BS communications module, a network communications module, and a system communications management module, Input/Output (I/O) ports, I/O components, and power supply (not explicitly illustrated in FIG. 10). Each of these components may be in communication with each other, directly or indirectly, over one or more buses 1024. In one implementation, the node 1000 may be a UE or a BS that performs various functions described herein, for example, with reference to FIGS. 1 through 9.

The transceiver 1006 having a transmitter 1016 (e.g., transmitting/transmission circuitry) and a receiver 1018 (e.g., receiving/reception circuitry) may be configured to transmit and/or receive time and/or frequency resource partitioning information. In some implementations, the transceiver 1006 may be configured to transmit in different types of subframes and slots including, but not limited to, usable, non-usable and flexibly usable subframes and slot formats. The transceiver 1006 may be configured to receive data and control channels.

The node 1000 may include a variety of computer-readable media. Computer-readable media can be any available media that can be accessed by the node 1000 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, Radio Frequency (RF), infrared and other wireless media. Combinations of any of the above should also be included within the scope of computer-readable media.

The memory 1002 may include computer-storage media in the form of volatile and/or non-volatile memory. The memory 1002 may be removable, non-removable, or a combination thereof. For example, the memory 1002 may include solid-state memory, hard drives, optical-disc drives, etc. As illustrated in FIG. 10, the memory 1002 may store computer-readable and/or -executable instructions 1014 (e.g., software codes) that are configured to, when executed, cause the processor 1008 to perform various functions described herein, for example, with reference to FIGS. 1 through 9. Alternatively, the instructions 1014 may not be directly executable by the processor 1008 but may be configured to cause the node 1000 (e.g., when compiled and executed) to perform various functions described herein.

The processor 1008 (e.g., having processing circuitry) may include an intelligent hardware device, a Central Processing Unit (CPU), a microcontroller, an ASIC, etc. The processor 1008 may include memory. The processor 1008 may process the data 1012 and the instructions 1014 received from the memory 1002, and information through the transceiver 1006, the base band communications module, and/or the network communications module. The processor 1008 may also process information to be sent to the transceiver 1006 for transmission through the antenna 1010, to the network communications module for transmission to a core network.

One or more presentation components 1004 may present data indications to a person or other device. Examples of presentation components 1004 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a Base Station (BS) for handling repetitions of transmissions in a wireless communication system, the method comprising:
    transmitting, to a User Equipment (UE), a Radio Resource Control (RRC) configuration comprising a first parameter configured with a first value and a second parameter configured with at least one second value, each of the first value and the at least one second value indicating a number of Physical Uplink Shared Channel (PUSCH) repetitions; and
    transmitting, to the UE, Downlink Control Information (DCI) on a Physical Downlink Control Channel (PDCCH) scheduling a PUSCH transmission,
    wherein the DCI enables the UE to:
        select one of the first parameter and the second parameter to determine the number of PUSCH repetitions for the PUSCH transmission;
        determine the number of PUSCH repetitions for the PUSCH transmission as the first value when the first parameter is selected;
        determine the number of PUSCH repetitions for the PUSCH transmission as one of the at least one second value indicated by the DCI when the second parameter is selected; and
        perform the PUSCH transmission for a number of times based on the determined number of PUSCH repetitions for the PUSCH transmission.

2. The method of claim 1, wherein the DCI further enables the UE to:
    select the second parameter to determine the number of PUSCH repetitions for the PUSCH transmission when the DCI has a DCI format associated with the second parameter and comprises an index indicating the one of the at least one second value.

3. The method of claim 2, wherein the second parameter defines an association between the index and a set of values including a third value indicating a starting symbol of the PUSCH transmission and a fourth value indicating a number of consecutive symbols of the PUSCH transmission.

4. The method of claim 1, wherein the first parameter and the second parameter are configured per a Bandwidth Part (BWP) basis.

5. A Base Station (BS) for handling repetitions of transmissions in a wireless communication system, the BS comprising:
    one or more non-transitory computer-readable media storing one or more computer-executable instructions; and
    at least one processor coupled to the one or more non-transitory computer-readable media, and configured to execute the one or more computer-executable instructions to:
        transmit, to a User Equipment (UE), a Radio Resource Control (RRC) configuration comprising a first parameter configured with a first value and a second parameter configured with at least one second value, each of the first value and the at least one second value indicating a number of Physical Uplink Shared Channel (PUSCH) repetitions; and
        transmit, to the UE, Downlink Control Information (DCI) on a Physical Downlink Control Channel (PDCCH) scheduling a PUSCH transmission,
        wherein the DCI enables the UE to:
            select one of the first parameter and the second parameter to determine the number of PUSCH repetitions for the PUSCH transmission;
            determine the number of PUSCH repetitions for the PUSCH transmission as the first value when the first parameter is selected;
            determine the number of PUSCH repetitions for the PUSCH transmission as one of the at least one second value indicated by the DCI when the second parameter is selected; and
            perform the PUSCH transmission for a number of times based on the determined number of PUSCH repetitions for the PUSCH transmission.

6. The method of claim 5, wherein the DCI further enables the UE to:
    select the second parameter to determine the number of PUSCH repetitions for the PUSCH transmission when the DCI has a DCI format associated with the second parameter and comprises an index indicating the one of the at least one second value.

7. The method of claim 6, wherein the second parameter defines an association between the index and a set of values including a third value indicating a starting symbol of the PUSCH transmission and a fourth value indicating a number of consecutive symbols of the PUSCH transmission.

8. The method of claim 5, wherein the first parameter and the second parameter are configured per a Bandwidth Part (BWP) basis.

* * * * *